United States Patent [19]

Allen et al.

[11] 4,436,500
[45] Mar. 13, 1984

[54] IN-LINE ROTATIONAL CASTING APPARATUS

[75] Inventors: Fred E. Allen; Bruce W. Thuener, both of Millville; Peter R. Shadinger, Vineland, all of N.J.

[73] Assignee: Wheaton Industries, Millville, N.J.

[21] Appl. No.: 109,798

[22] Filed: Jan. 7, 1980

[51] Int. Cl.³ ............................................. B29C 5/04
[52] U.S. Cl. ...................................... 425/290; 83/30; 83/660; 141/137; 198/482; 198/485; 425/430; 425/447; 425/449
[58] Field of Search ............... 425/430, 447, 449, 290; 141/137; 83/30, 660; 198/485, 482

[56] References Cited

U.S. PATENT DOCUMENTS

| | | | |
|---|---|---|---|
| 2,108,067 | 2/1938 | Latinberg et al. | 425/430 |
| 2,696,024 | 12/1954 | Mobley et al. | 425/430 |
| 3,115,964 | 12/1963 | Logan | 198/485 |
| 3,191,643 | 6/1965 | Roth | 141/137 |
| 3,838,964 | 10/1974 | Hake | 425/430 |
| 3,880,562 | 4/1975 | Hujik | 425/447 |

*Primary Examiner*—James H. Derrington
*Attorney, Agent, or Firm*—Ratner & Prestia

[57] ABSTRACT

Continuous hollow object casting machine comprises a plurality of chucks with means to convey the chucks through a helical path along a longitudinal, preferably a closed longitudinal, path, in the course of which the chucks are also rotated about an axis perpendicular to the primary helical path and the rate of movement there along being devised to permit substantially complete hardening of a molding material in molds carried by the chucks so that casts, with molten material therein, may be loaded at one end of the path and unloaded, with a hollow object molded therein, at the other end of the path. Auxiliary equipment which is also part of this invention includes an automatic filler, adapted to move along with lower mold halves carried on a loading conveyor during the movement thereof and dispense metered amounts of a molding composition or mixture, an automatic loader for receiving molds and mold retainers from the loading conveyor and transferring them to chucks on the casting machine, an automatic piercer for providing air escape holes from the molded object just after they have been formed, and means for synchronizing the movement of all of the foregoing apparatus and components.

27 Claims, 24 Drawing Figures

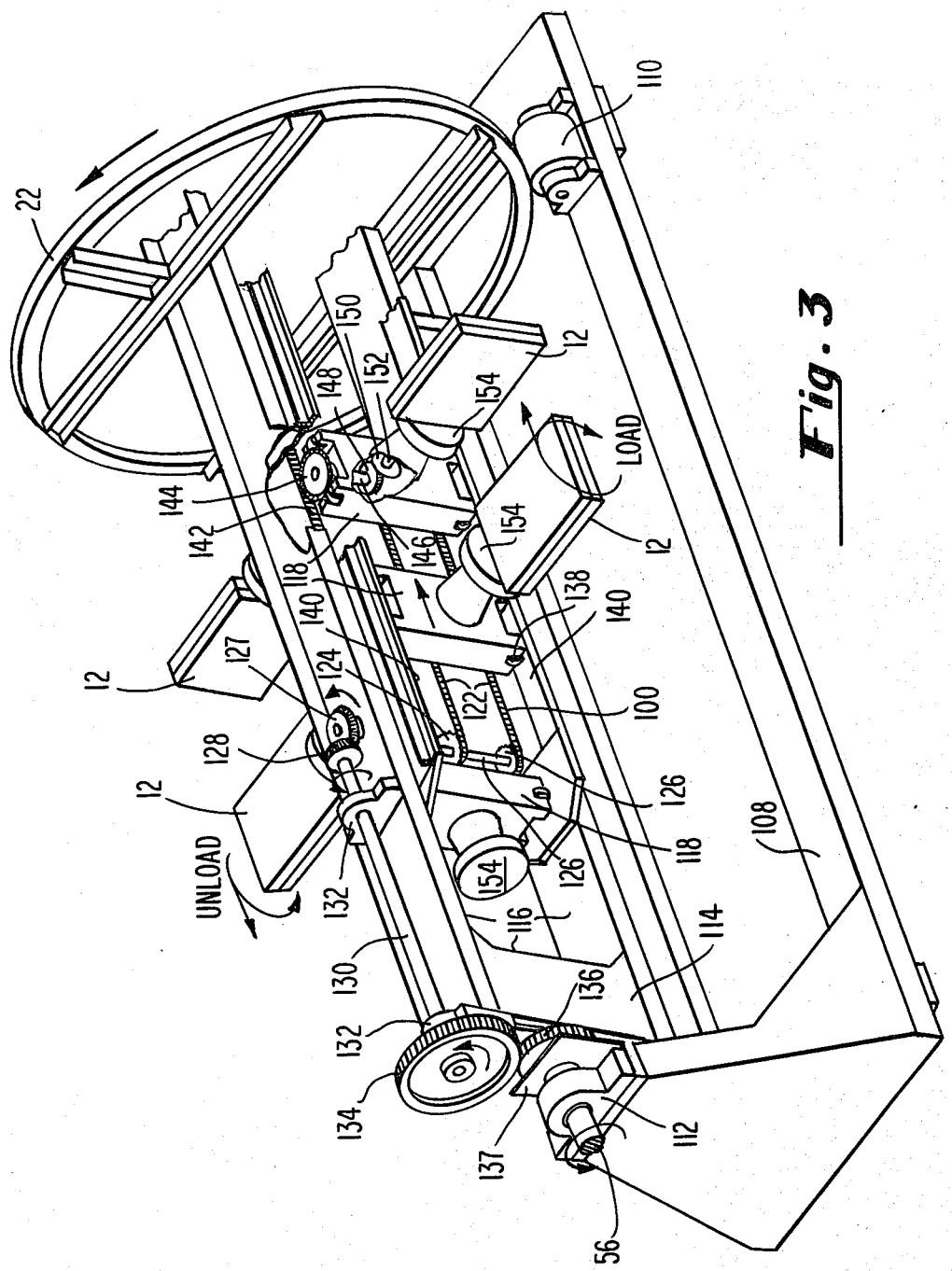

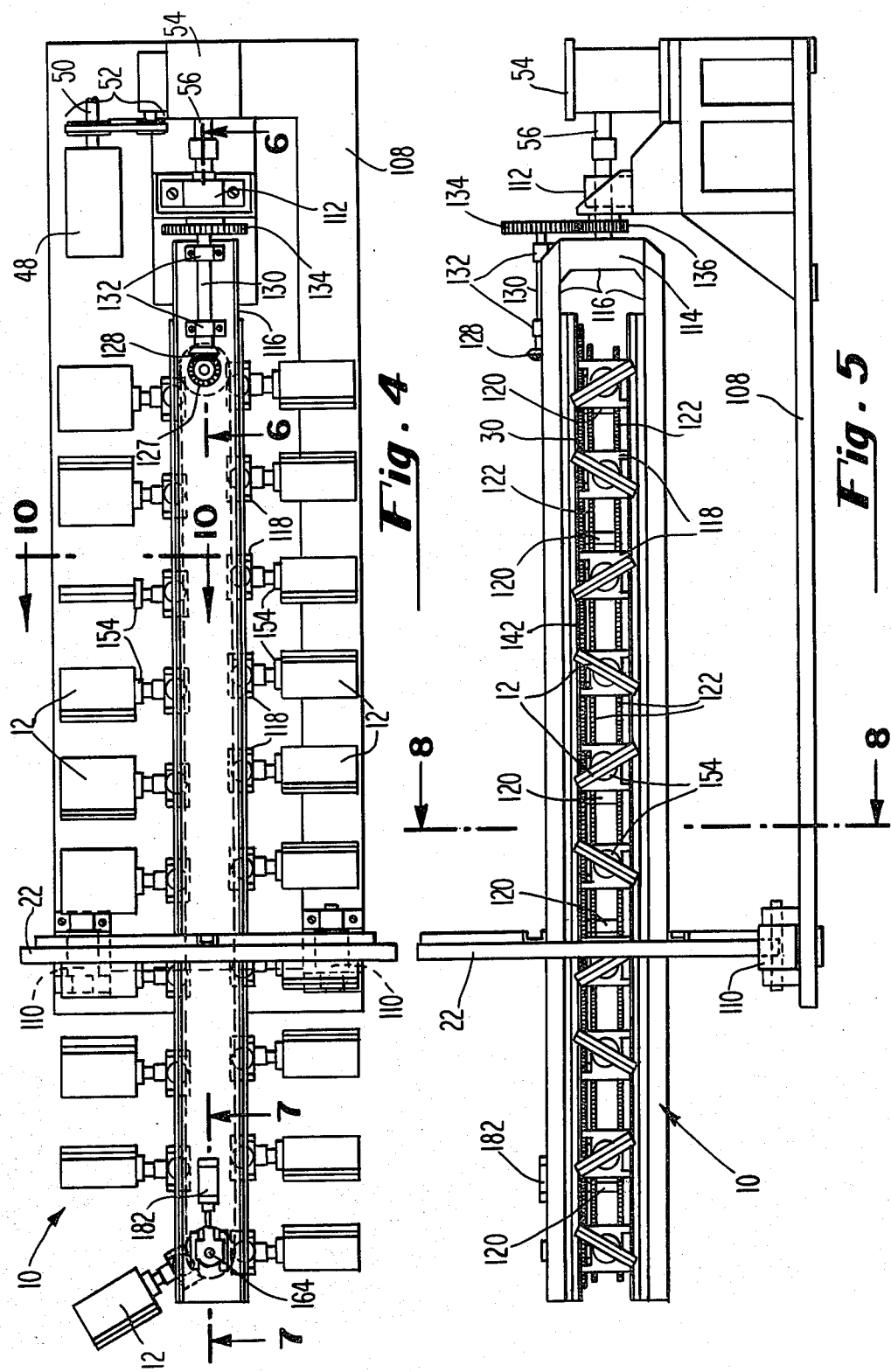

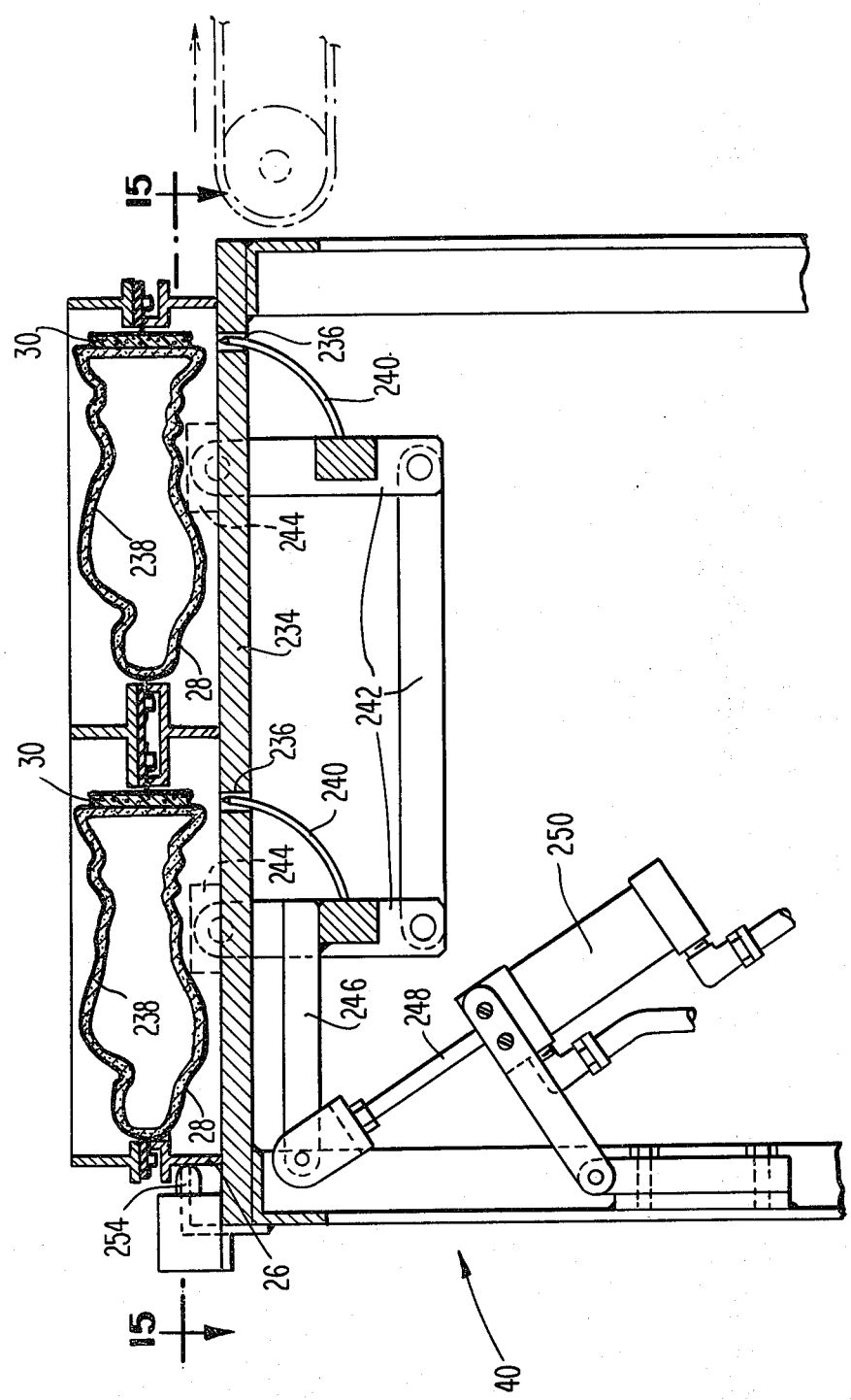

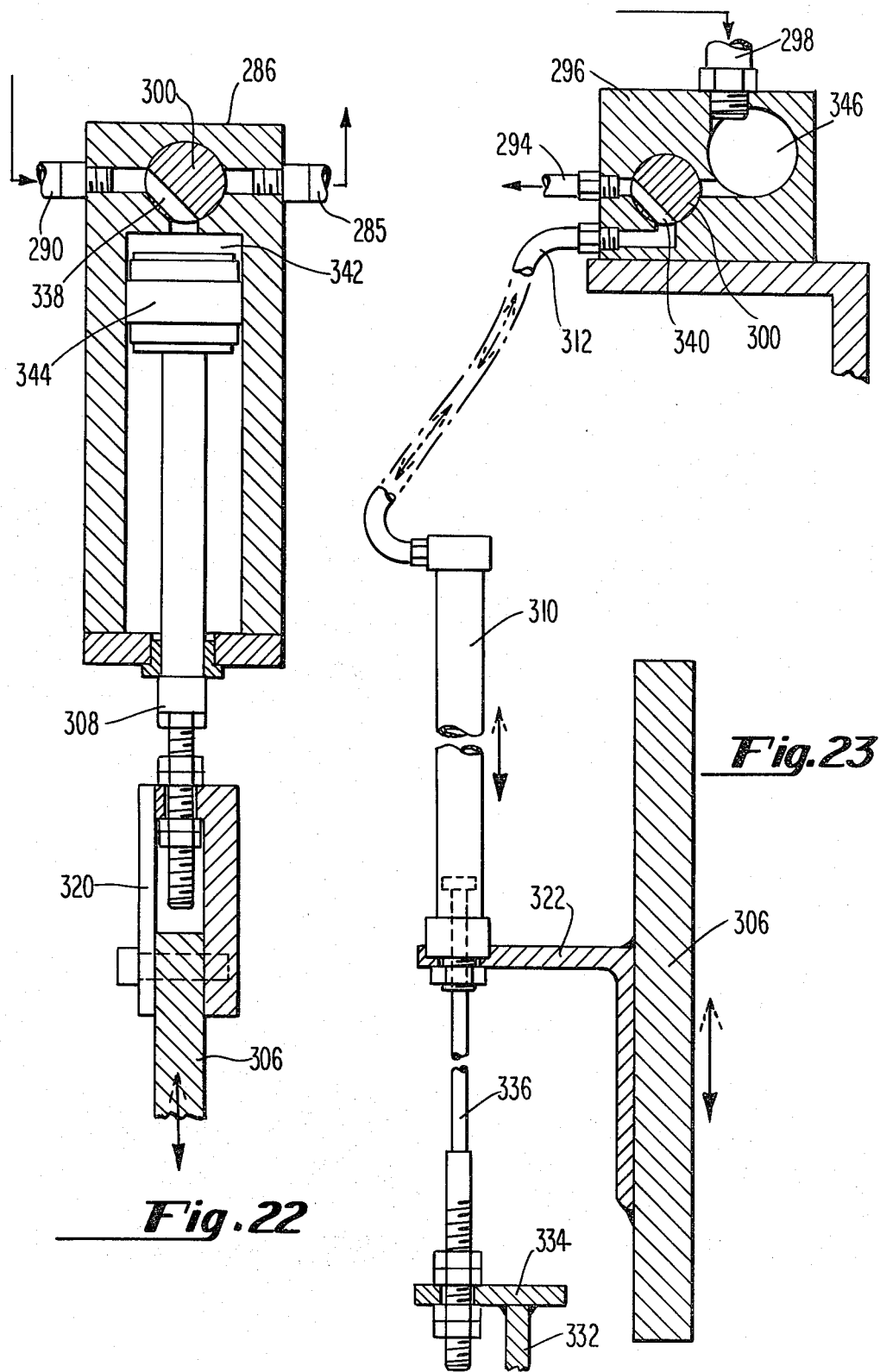

IN-LINE ROTATIONAL CASTING APPARATUS

This invention pertains to a machine and integrated auxiliary apparatus for spin-casting hollow objects.

Heretofore, hollow objects have been made by spin-casting, i.e. rotating about a plurality of axes, a molding material contained in a closed mold, which molding material hardens in the course of the multiple axis rotation to form a hollow object conforming to the configuration of the closed mold. Chocolate bunnies and fragrance-containing wax room fresheners in decorative shapes, such as owls and Christmas trees are typical of products which have been made in this manner.

Known apparatus for such spin-casting applications has heretofore consisted of machines comprising a rotating drum, on the outer circumference of which a plurality of mounting chucks are located, each of the mounting chucks in turn being rotated about its individual axis, concurrently with the rotational movement of the main drum. Spin cast molds are manually mounted on these chucks, magnetically in some cases, and manually removed, the time of casting for each mold being separately determined and the mold generally being manually assembled and filled. Obviously, this is a time consuming and labor-intensive operation.

The purpose of the present invention is to provide a more automatic apparatus with synchronized loading and filling mechanisms.

A particular object of this invention is to provide a spin-casting machine adapted for relatively convenient loading and unloading, which is essentially self-controlling with respect to the timing of the spin-casting operation for each individual mold.

It is a specific object of the present invention to provide an integrated apparatus for spin-casting fragrance-containing wax decorative room fresheners in thin plastic molds, adapted also to serve as shipping package for the molded object, and to do so in high volume with consistent product quality.

These purposes and objects, and others which will be apparent in the course of the subsequent description of this invention, are meant by an in-line rotational casting apparatus in which a plurality of magnetic chucks are disposed and adapted for movement in a closed longitudinal path along a beam assembly, both beam assembly and the individual chucks being rotatable in the course of the chuck movement about the beam assembly. In this manner, a mold assembly attached to a chuck and filled with molding material travels a path of predetermined length adapted to permit hardening of the molding material, the path comprising generally a helix along a horizontal axis with concurrent rotational movement of each mold about radial axes perpendicular to the main horizontal axis. In this manner, the molten material is spin cast into a hollow object in the course of its travel about the beam assembly of the machine.

In the preferred form of the present invention, the in-line rotational casting machine is also combined with automatic fill metering and dispensing means which travels synchronously with lower mold elements along an in-line conveyor. Also included is an automatic loader for transferring mold assemblies from the in-line conveyor to successively presented molds at a loading station of the in-line rotational casting machine.

Further included in the preferred form of the present invention is a semi-automatic piercing apparatus for providing vent holes in the spin cast products.

For a better understanding of the present invention, including the detailed designs and preferred embodiments thereof, reference may be made to the following detailed description, taken in conjunction with the subjoined claims and the appended drawings, in which:

FIG. 3 is a partial perspective view of one end of the machine shown in FIG. 1;

FIGS. 4 and 5 are plan and side elevational views, respectively, of the machine shown in FIG. 1;

Figure 1:
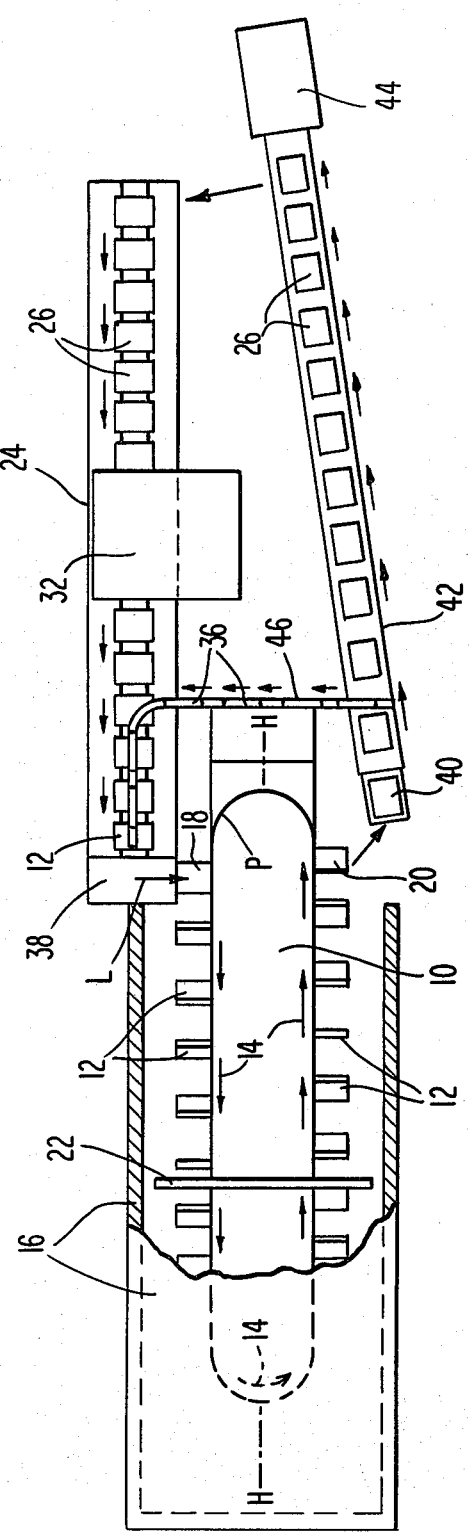
FIG. 1 is a schematic plan view of the in-line rotational spin-casting machine and integrated auxiliary equipment of the present invention in its preferred form.
Figure 6:
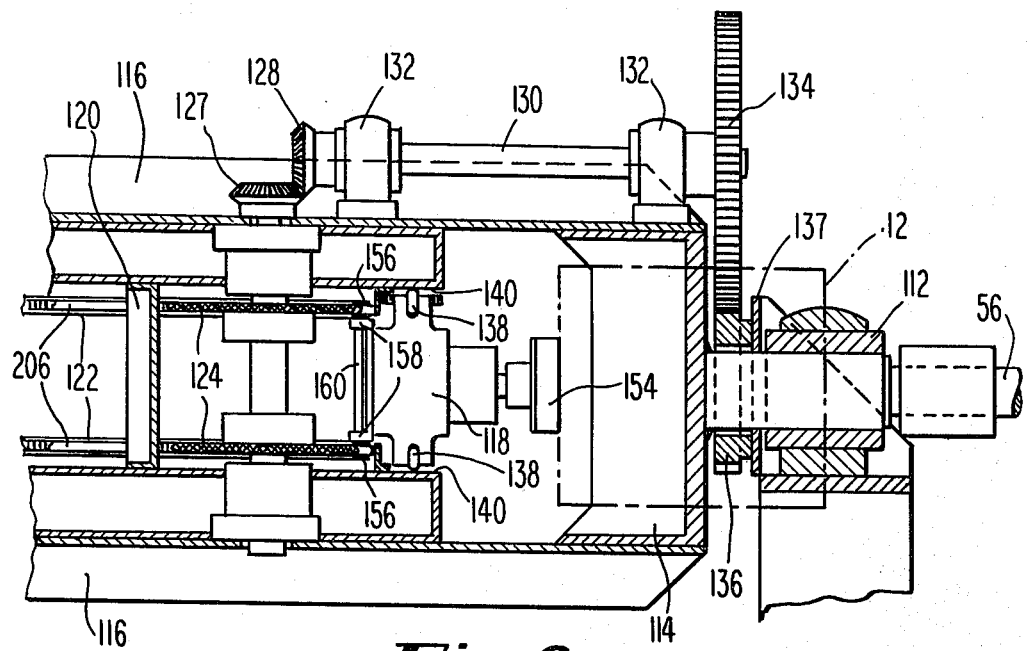
Figure 7:
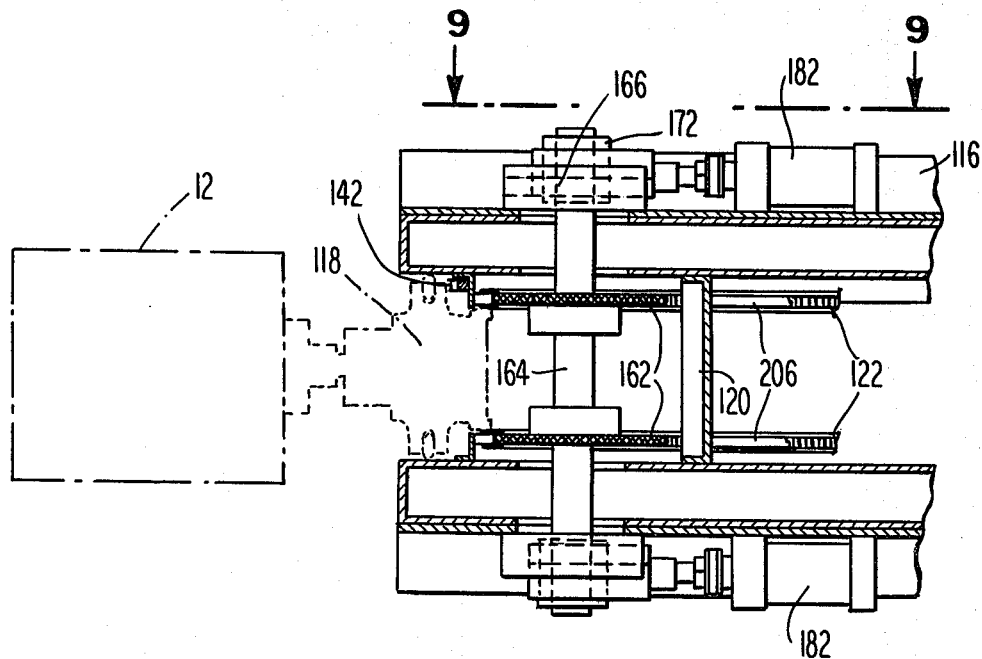
Figure 8:
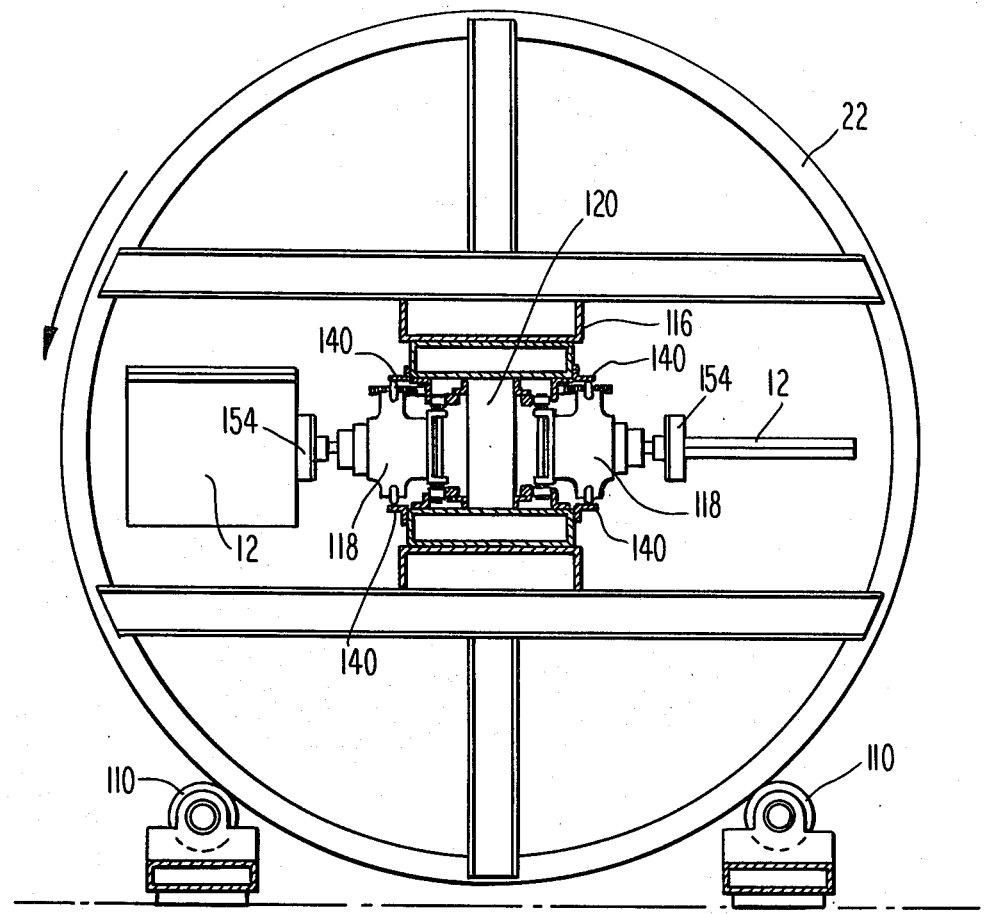
Figure 9:
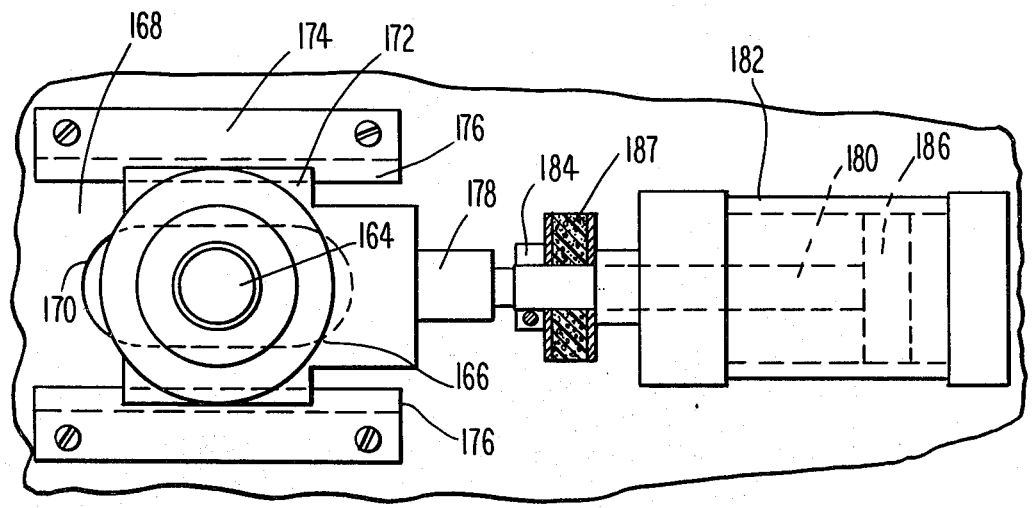
Figure 10:
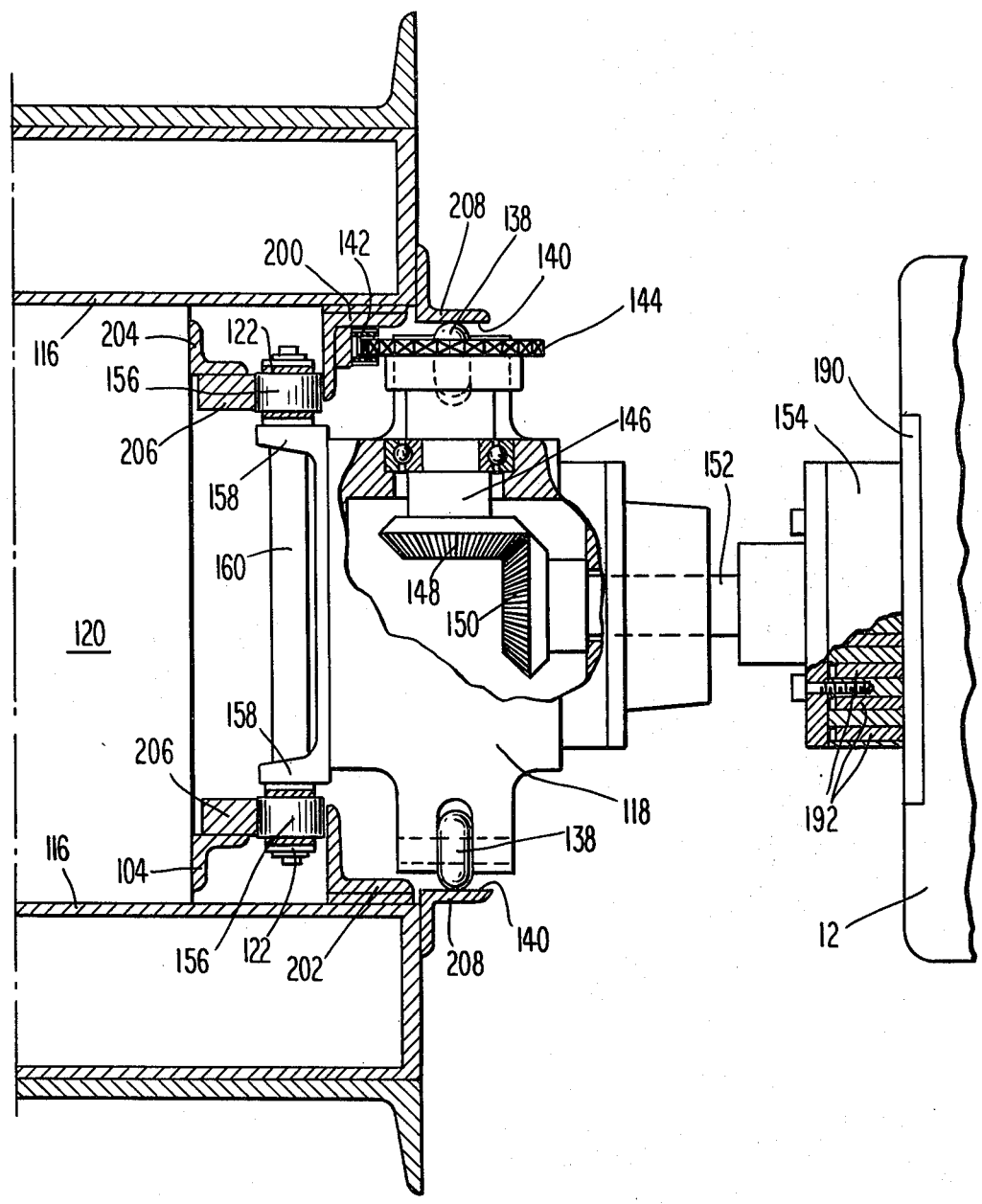
Figure 11:
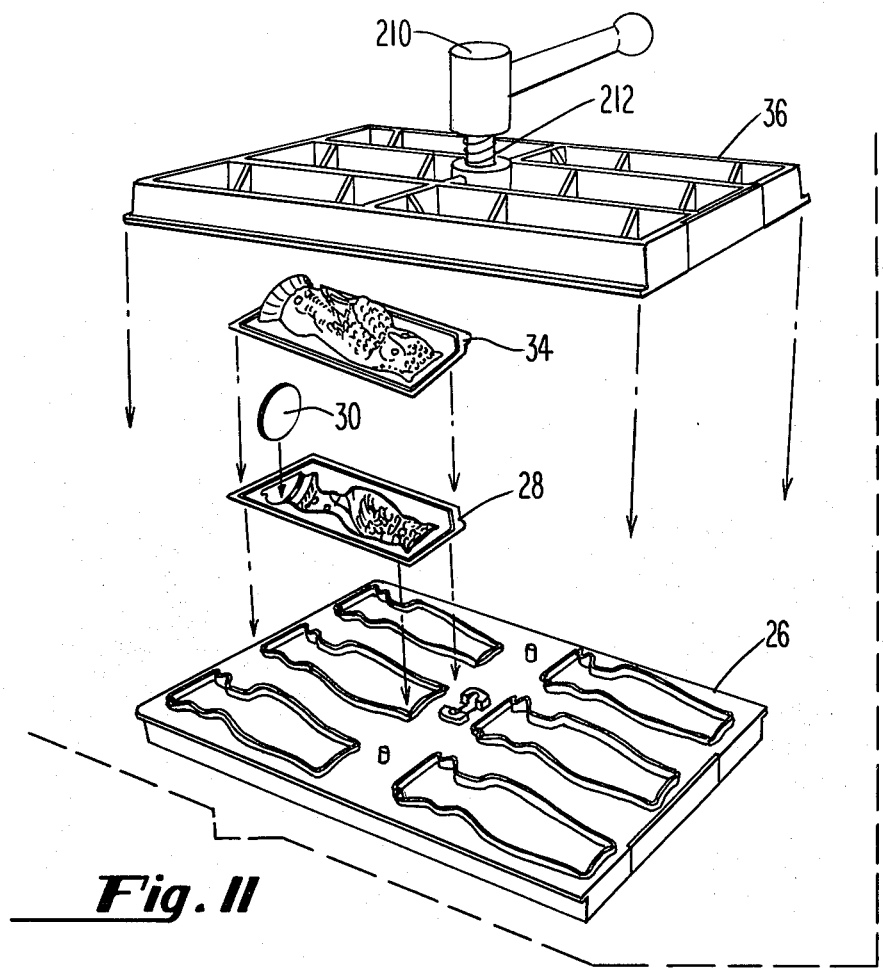
Figure 12:
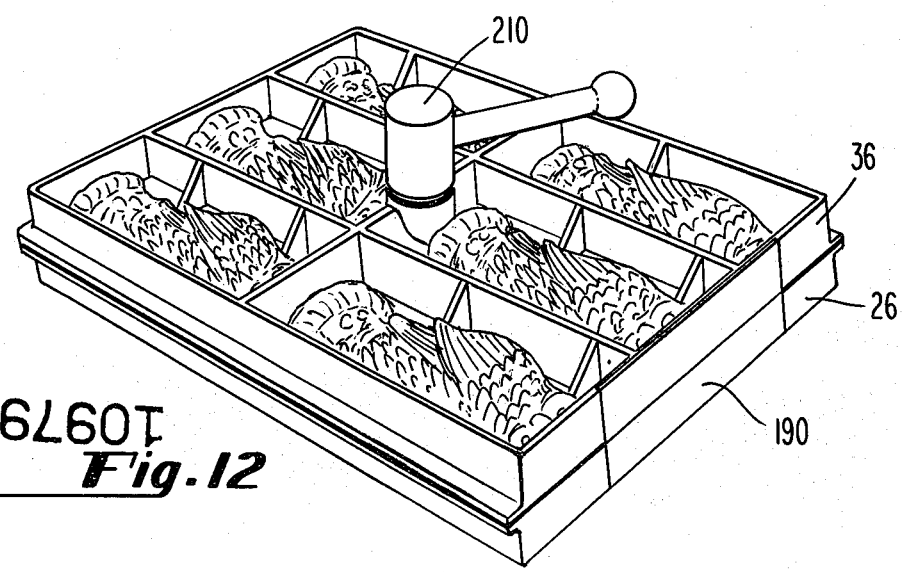
Figure 13:
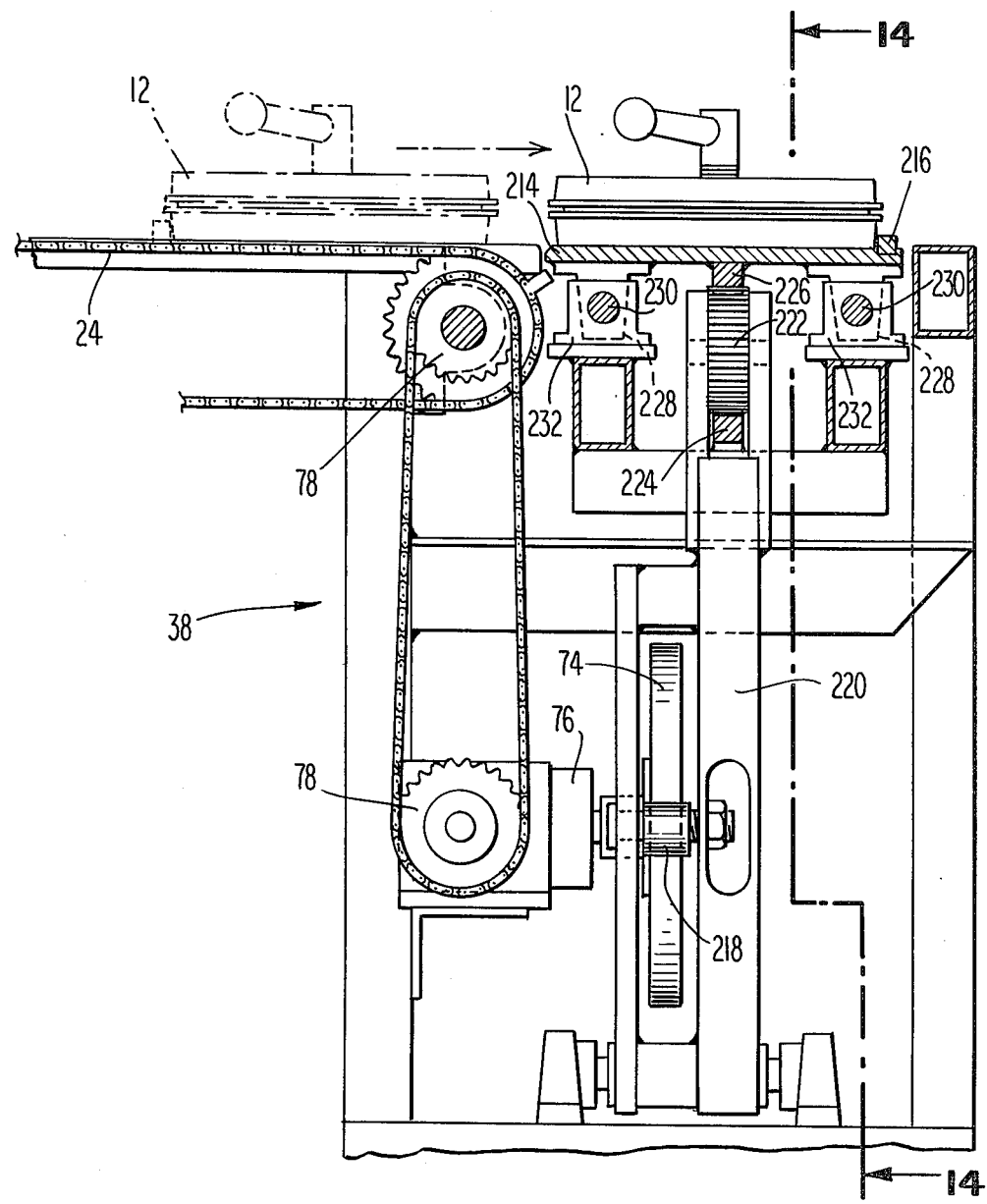
Figure 14:
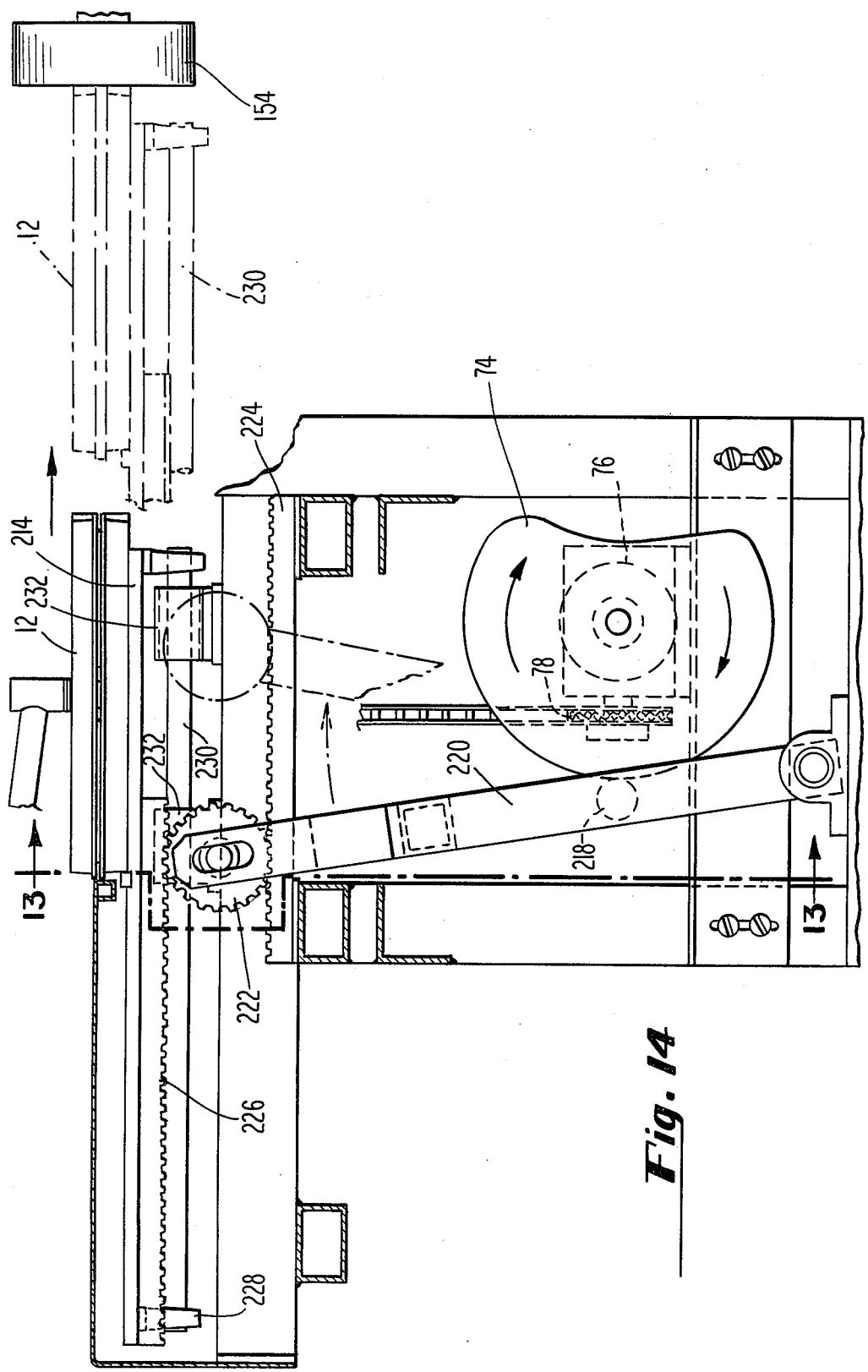
Figure 15:
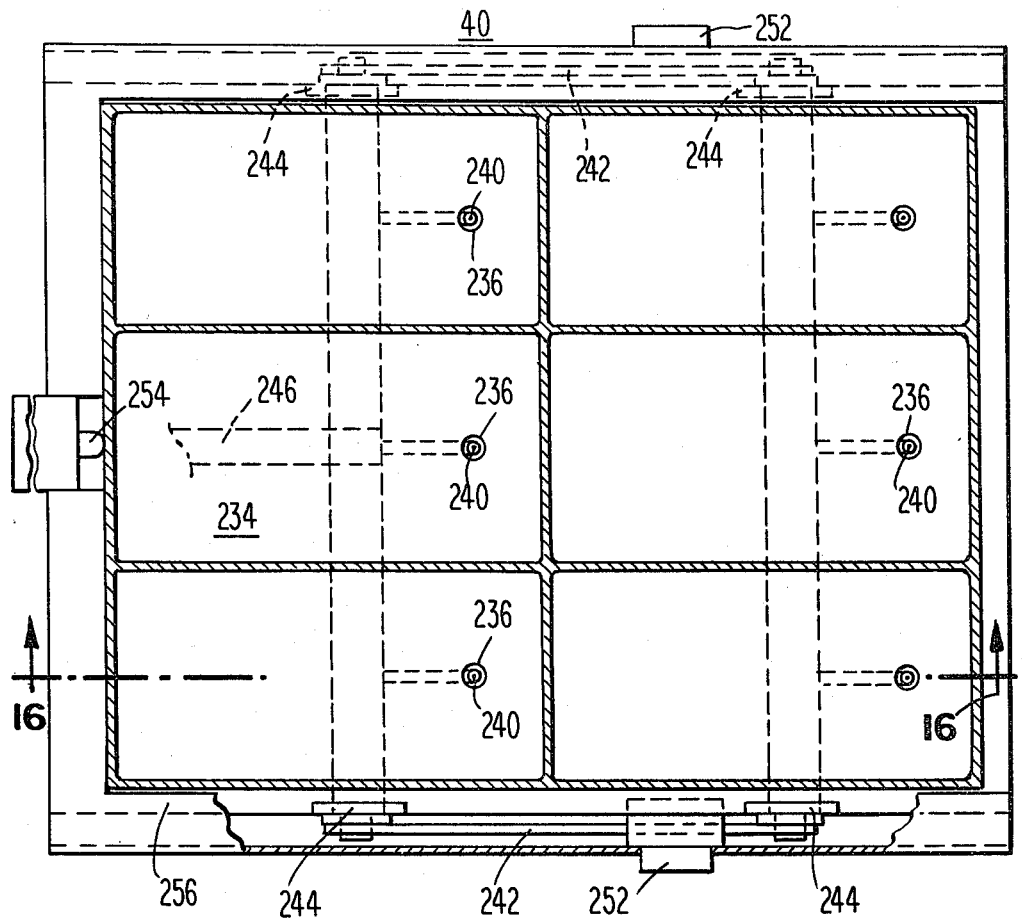
Figure 17:
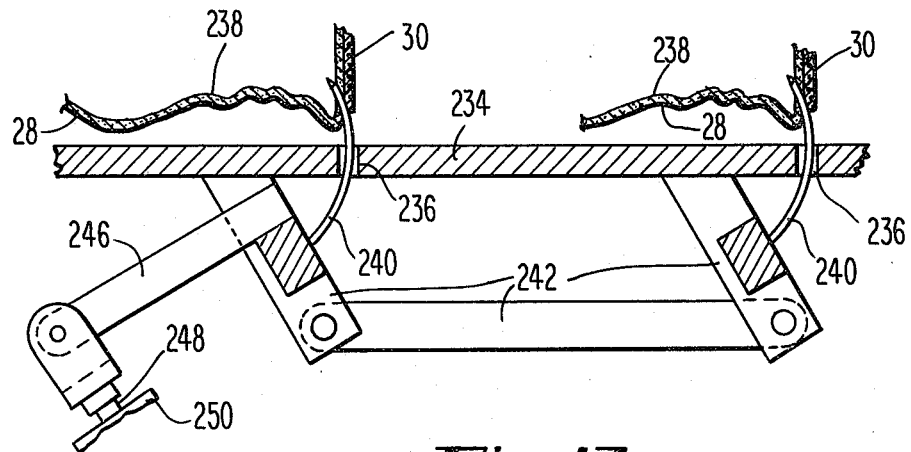
Figure 18:
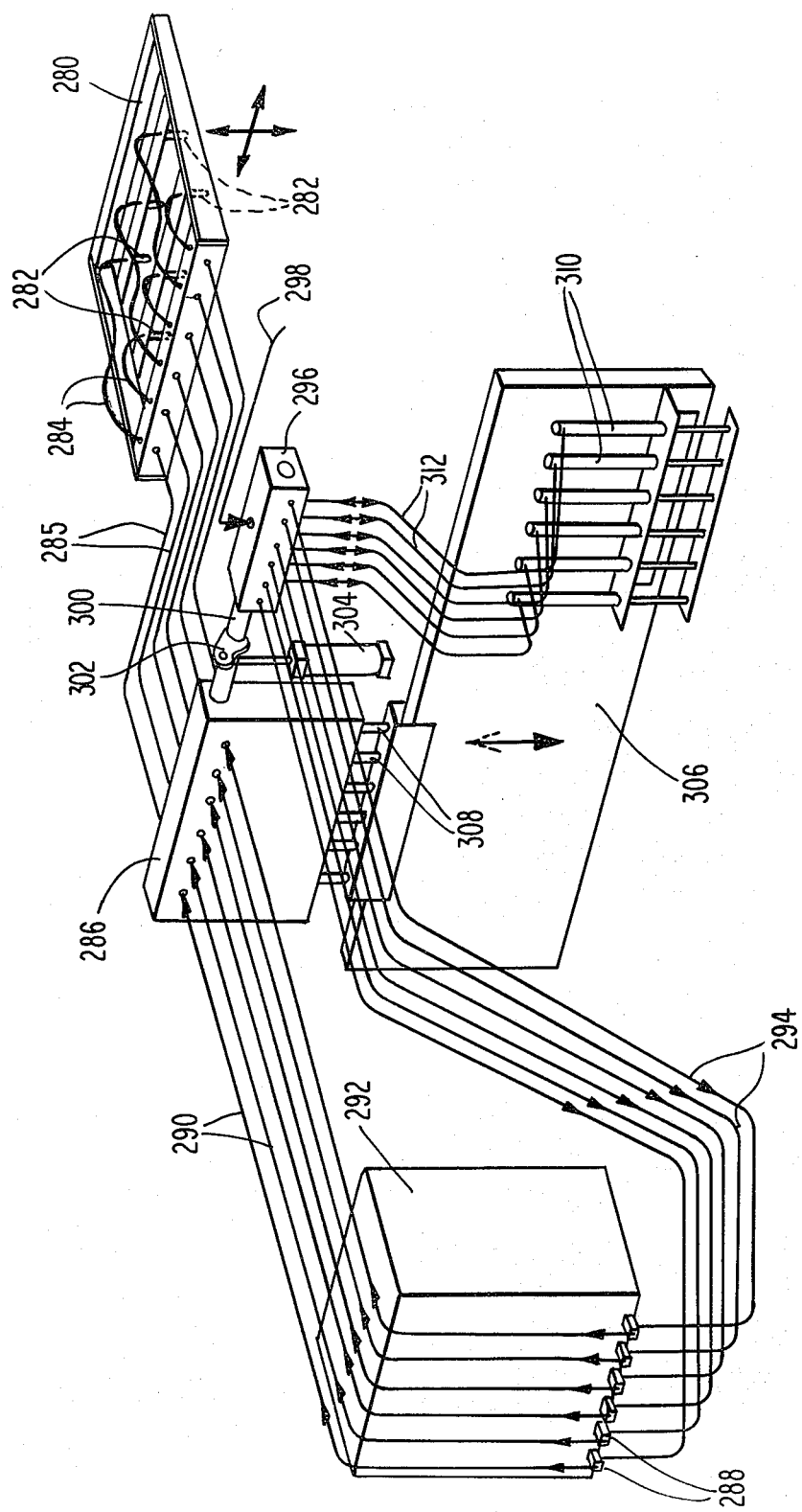
Figure 19:
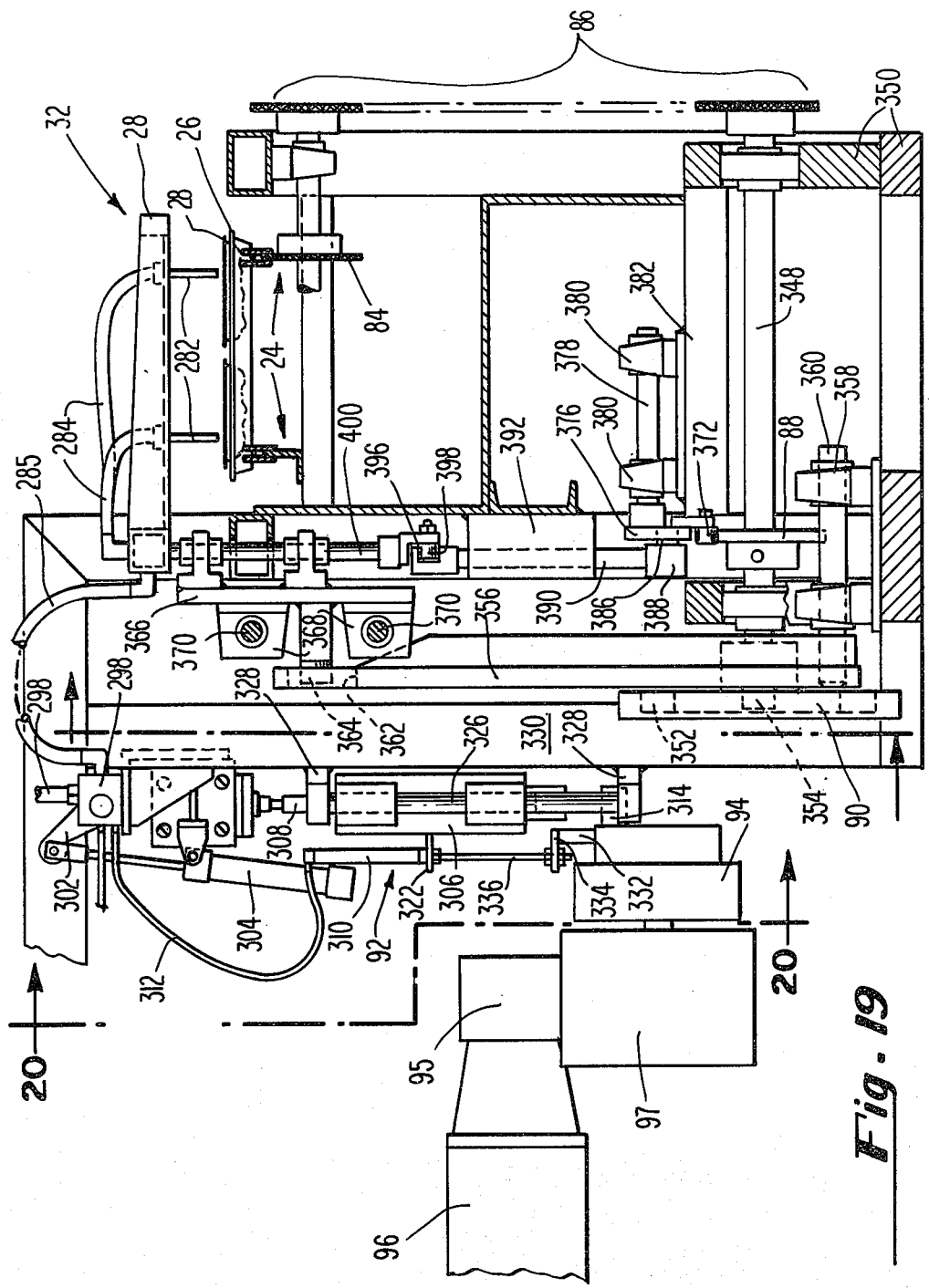
Figure 20:
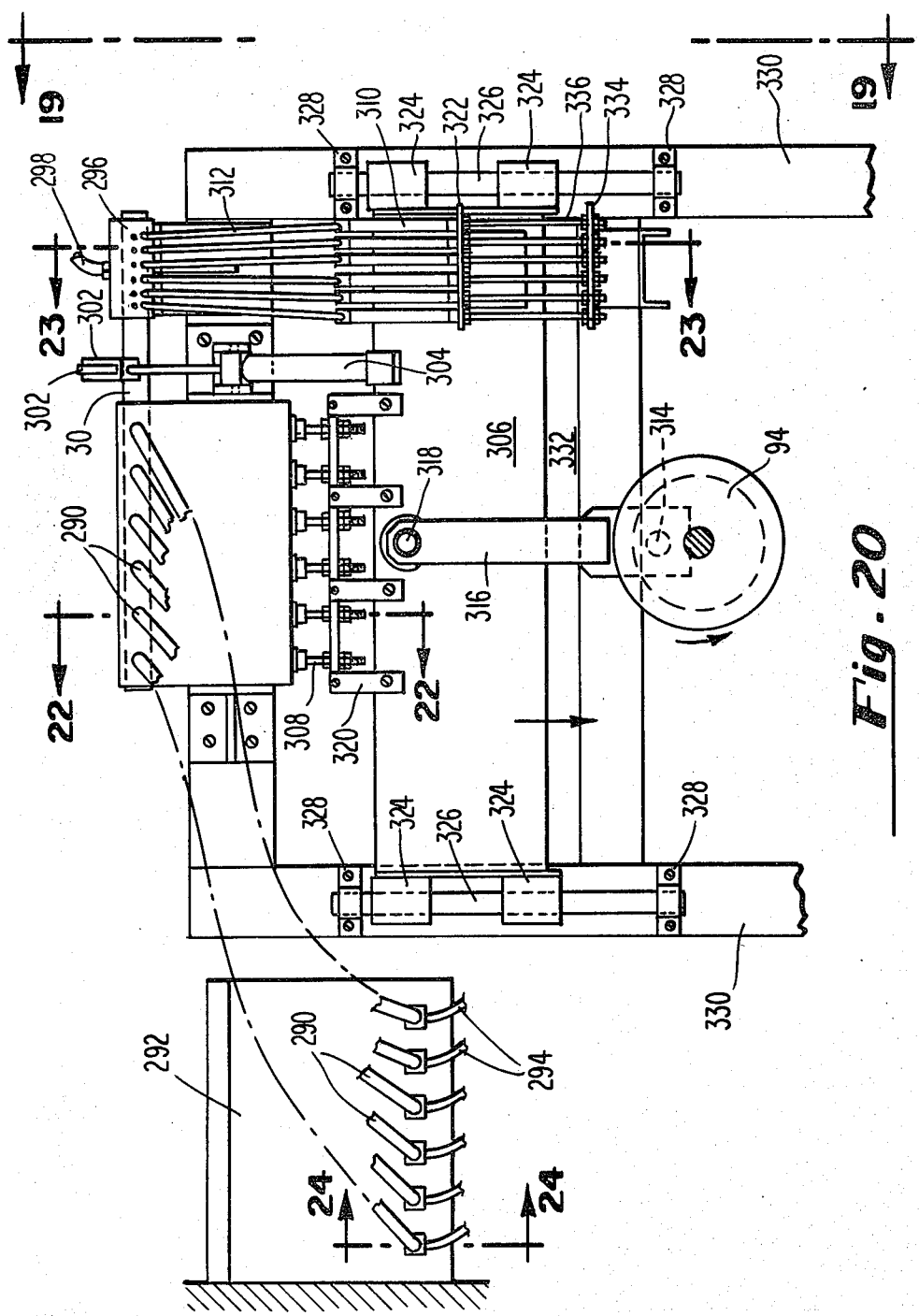
Figure 21:
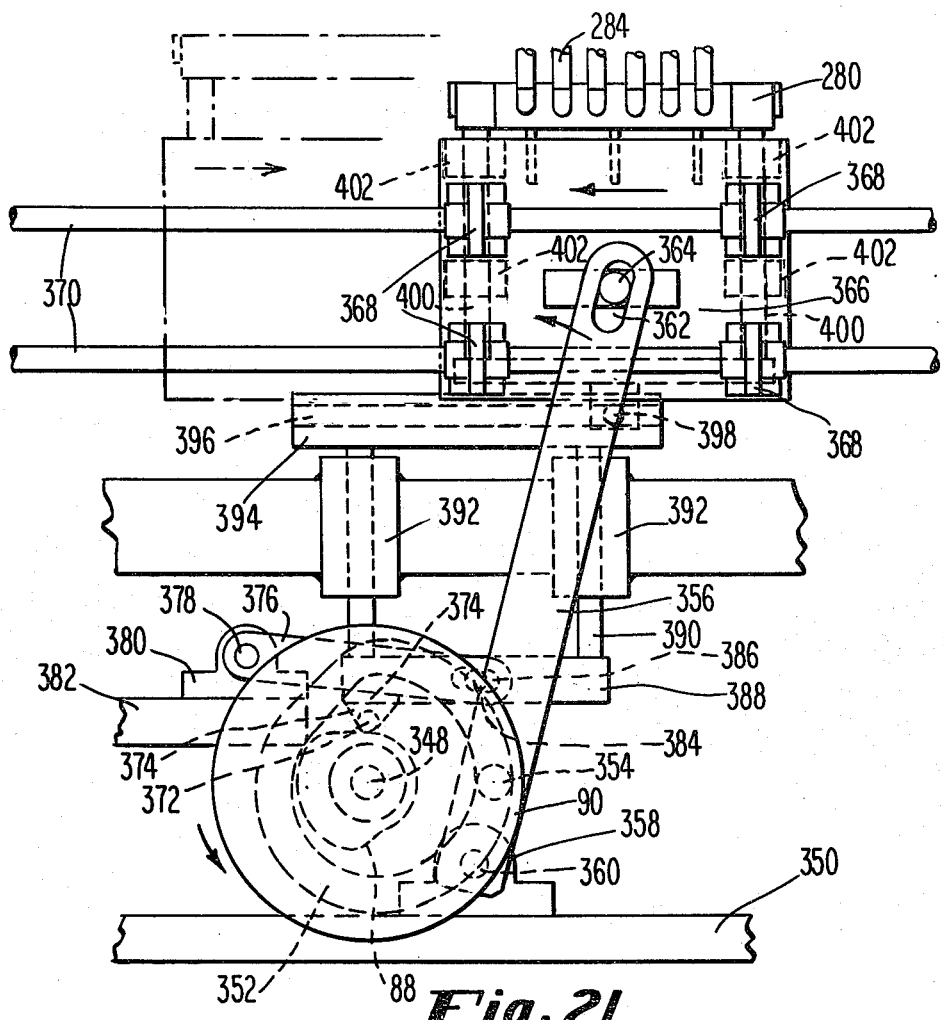
Figure 24:
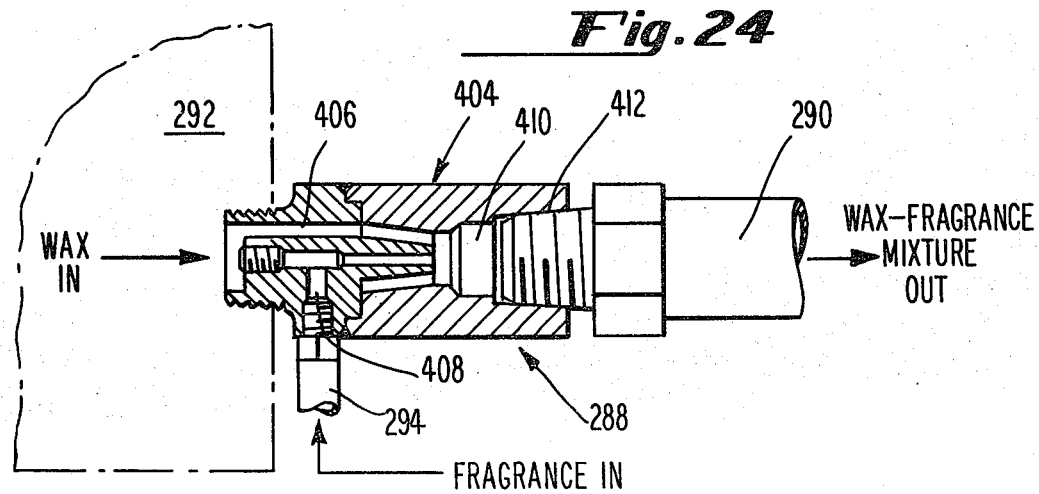

FIGS. 6, 7 and 8 are sectioned detailed view of the machine of FIG. 1 in the planes 6—6, 7—7 and 8—8 respectively, shown in FIGS. 4 and 5;

FIG. 9 is a further expanded detailed view of the chain tensioning means in the machine of the present invention, taken in the plane 9—9 shown in FIG. 7;

FIG. 10 is an enlarged, sectioned and partially cut away detailed view, taken in the plane 10—10, of the revolving chuck and work piece shown in FIG. 4;

FIGS. 11 and 12 are pre-assembly and assembled views, respectively, of mold elements used in a machine of the type heretofore shown;

FIG. 13 is an expanded elevation view, partially in section, of the loader sub-assembly of the apparatus shown in FIG. 1;

FIG. 14 is also an elevation view, partially in section, of the loader sub-assembly shown in FIG. 13, taken in the plane 14—14 of FIG. 13;

FIG. 15 is a plan view, partially in section, of the product piercing sub-assembly of the apparatus shown in FIG. 1;

FIG. 16 is an elevation view of the piercer shown in FIG. 15, taken in the plane 16—16 of FIG. 15;

FIG. 17 is a partial expanded sectional view of certain elements of the piercer shown in FIG. 15, in the operational position thereof;

FIG. 18 is a schematic perspective view of the major components of the filler sub-assembly of the apparatus shown in FIG. 1;

FIG. 19 is a detailed sectional elevation view of the filler sub-assembly taken in a direction along the length of the loading conveyor 24, as shown in FIG. 1;

FIG. 20 is an expanded, detailed, sectional elevation view of the sub-assembly shown in FIG. 19, taken in the plane 20—20 thereof;

FIG. 21 is an expanded, detailed, sectioned view of certain components of the filler assembly shown in FIG. 19 taken in the plane 21—21 thereof;

FIGS. 22 and 23 are also detailed expanded sectioned views of the sub-assembly components, taken in the planes 22—22 and 23—23 of FIG. 20; and FIG. 24 is a detailed sectional view of a mixing valve used in a specific filler sub-assembly.

Referring specifically to FIG. 1, there is shown schematically, the plan layout of a horizontally disposed in-line rotational spin-casting machine 10, in which a plurality of hollow object casting molds 12 are transported in an elongated elliptical path P, in a direction indicated by arrows 14, by means described more fully hereafter. During transport by machine 10, molds 12 are cooled, at a predetermined rate, by the enclosure of machine 10 in cooling tunnel 16, partially cut away in FIG. 1. Molds 12 are loaded onto machine 10 at loading station 18 and are removed at unloading station 20. Horizontally displaced from loading station 18 and unloading station 20, about ⅔rds of the way along the length of machine 10, is an encircling rotary support member 22 (seen better in FIG. 3) which permits rotation of a beam assembly 116 (see best in FIGS. 3 and 4) about its horizontal axis H, by means and in a manner better seen in subsequent figures. The combined effects of these movements results in each mold traveling a helical path about axis H, first in one longitudinal direction and then in the reverse direction.

In the course of travel of each mold 12 in its to and fro helical path from loading station 18 to unloading station 20, each such mold is retained on a chuck which also rotates the mold about an axis radial to the horizontal axis H of machine 10, as more fully shown and described hereafter. Thus a molding material (typically wax, and some referred to hereafter as wax) is spin cast into a hollow molded object in the course of its passage through the machine.

Integrally associated with machine 10, in the preferred form of the present invention, is a loading conveyor on which is disposed a plurality of lower half mold retainers 26. As lower half mold retainers 26 progress along loading conveyor 24 (from right to left in FIG. 1), they are first loaded with lower mold elements 28 and insert labels 30 (shown in FIG. 11 but not in FIG. 1) and then passed under fill dispenser 32, which dispenses hot wax into each of the lower mold elements 28.

As lower half mold retainer 26 continues along the length of loading conveyor 24, they are further assembled with upper mold elements 34 and upper half mold retainers 36 (upper mold elements 34 also shown in FIG. 11 but not in FIG. 1). The assembly of lower half mold retainers 26, lower mold elements 28, insert labels 30, upper mold elements 34 and upper half mold retainers 36 (with the hot wax therein) together forming spin-casting molds 12.

At the end of loading conveyor 24, the assembly of lower half mold retainer 26, lower mold element 28 with fill dispensed from fill dispenser 32, insert label 30, upper mold element 34 and upper half mold retainer 36, comprising spin-casting mold 12, is automatically transferred to mold loader 38, which in turn loads successive casting molds 12 onto successively presented mold holding chucks 154, illustrated and described fully below (see particularly FIGS. 3 and 10).

As each casting mold 12 progresses through its pathway about casting machine 10 to unloading station 20, it is revolved both around horizontal axis H and about a radial axis perpendicular thereto, so that as it is cooled at a predetermined rate, under the influence of the temperature maintained in cooling tunnel 16, a molded hollow object is formed by spin-casting in mold 12 and is ready to be removed therefrom as casting mold 12 is removed from casting hine 10 at unloading station 20. Removal is accomplished manually, successive casting molds 12 being placed on a semi-automatic piercing table 40. Product conveyor 42, on which successive casting mold assemblies 12 are placed transports the products to product receiving bin 44.

In the course of movement of product along product conveyor 42, the upper half mold retainer 36 is removed from successive casting mold assemblies 12 and returned, via upper half mold retainer conveyor 46 for reuse by assembly with casting mold assembly components on loading conveyor 24.

Figure 2:
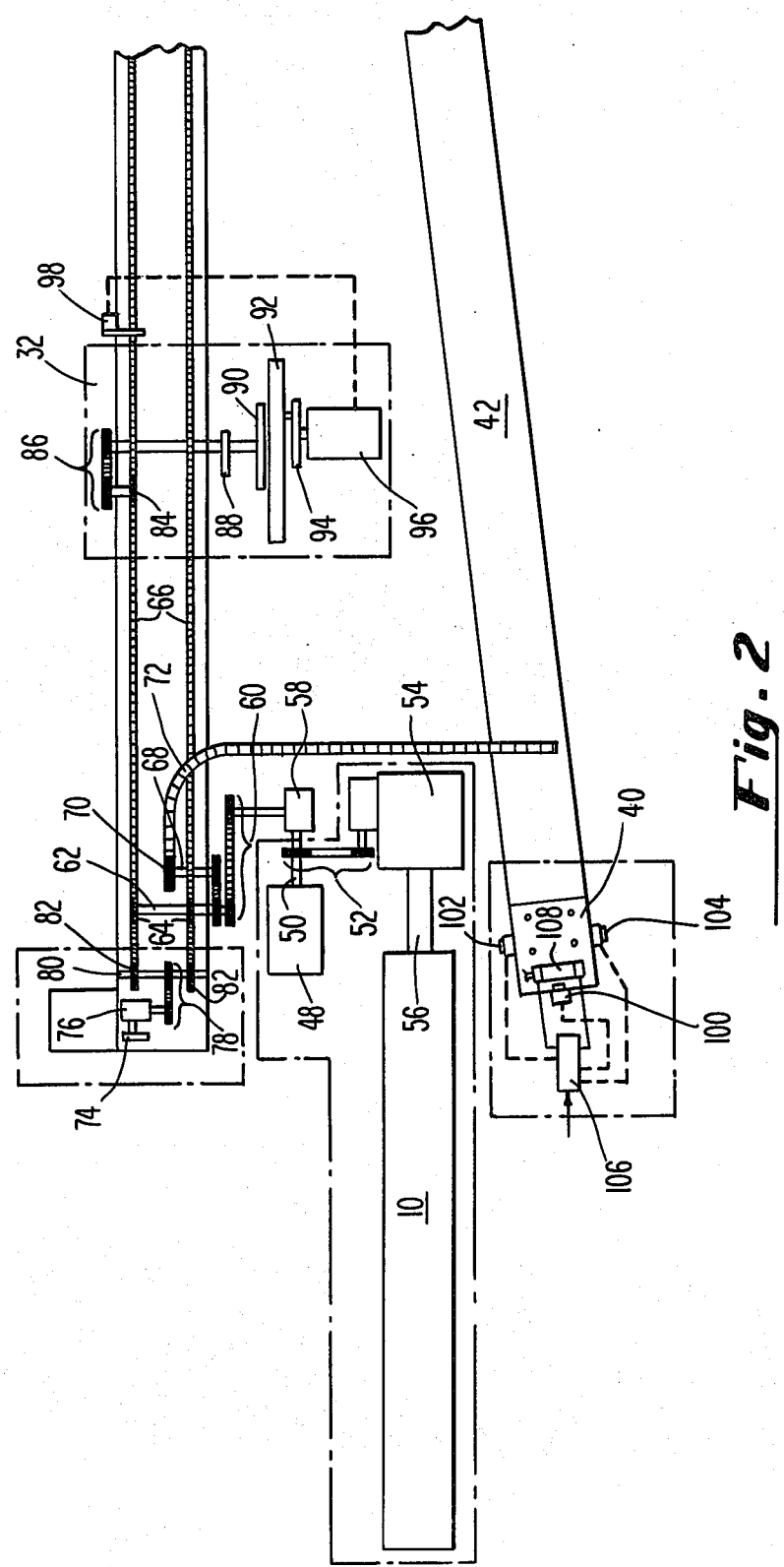
FIG. 2 is also a schematic plan view showing the drive synchronization means for the machine and auxiliary equipment of FIG. 1.

Shown schematically in FIG. 2 are the drive interconnections and synchronization means and certain functional sensing means which facilitate reliable and integrated operation of the casting machine of this invention, together with the auxiliary equipment, as combined in the preferred from of the invention.

More specifically, a main drive motor 48 with output shaft 50 is connected through a pulley and belt set 52 and power transmission box 54 to impart rotational movement to casting machine drive shaft 56.

Motor output shaft 50 also drives, through gear box 58 and sprocket and chain set 60, a sprocket shaft 62, from which power is taken off through sprocket wheels 64 to loading conveyor drive chains 66 and through sprocket shaft 68 to sprocket wheel 70, in turn driving sprocket chain 72 of upper half mold retainer return conveyor 46 (seen in FIG. 1 not FIG. 2).

Synchronous operation of automatic loader 38, as further illustrated and described below, in a reciprocatory path along the line of arrow L in FIG. 1, is imparted by loader driving cam 74 rotated by a shaft associated with loader gear box 76, in turn receiving rotational drive from a loader sprocket wheel and sprocket chain set 78, the driven sprocket wheel of which is mounted on idler shaft 80 associated with idler sprocket wheel 82 of loadingconveyor drive chain 66.

Also taking power, and thereby achieving synchronous drive, from loading conveyor drive chain 66 is feeder drive sprocket wheel 84, which through feeder drive sprocket wheel and sprocket chain set 86 imparts rotational movement to cams 88 and 90 by which fill dispenser 32 is reciprocally moved in a path along the length of loading conveyor 24, in timed relation therewith.

Fill dispenser 32, which will be further illustrated and described hereafter, also includes a fill valve assembly 92 by which a liquid material to be formed into a casting, typically wax, is metered into lower mold elements 28 disposed on loading conveyor 24, as lower mold elements 28 are transported lengthwise along loading conveyor 24 and fill dispenser 32 is moved in unison therewith. Fill valve assembly 92 in turn is operated by cam 94 driven by fill control motor 96, in turn operative upon indication from sensing means 98 of the presence of lower mold elements 28 on loading conveyor 24 in position to receive molten wax therein. This disposition of sensing means 98 just upstream, with respect to loading conveyor 24, of fill dispenser 32 necessitates a slight delay between sensing by sensing means 98 of lower mold elements 28 and operation of fill control motor 96 to dispense, through fill valve assembly 92, molten wax.

To prevent collapse of hollow molded objects formed in casting machine 10, upon cooling thereof, an air vent is formed by piercing each such molded object, just after it is removed from casting machine 10. Semi-automatic table 40, shown schematically in FIG. 2, is provided for this purpose. In accordance with one aspect of the preferred embodiment of the present invention, semi-automatic piercing table 40 includes a sensing means 100 to indicate the presence of a casting mold assembly 12 in position on table 40, and manually operated buttons 102 and 104 on opposite sides thereof, all of which must be activated simultaneously in order to operate, for safety. This occurs through activation of solonoid 106 and pneumatic cylinder 108, which in turn activates piercing means located below the surface of table 40 and adapted to pierce and to form a small vent in each of the molded products housed within the casting mold assembly 12 on table 40.

As seen in FIGS. 3, 4 and 5, casting machine 10 is mounted on frame 108, including idler support bushings 110 in rotational contact with encircling rotary support member 22 of casting machine 10, and pillow block bearing 112 through which projects casting machine drive shaft 56, and which is supported therein.

Drive shaft 56 in turn is connected to end brace 114 of beam assembly 116, which rotates with drive shaft 56 and serves as the carrier for a plurality of chuck mount and support boxes 118, as well as a transport and rotational drive system therefor described more fully below.

Beam assembly 116 also includes other beam supports 120 (not seen in FIG. 3) at spaced locations along the length thereof. Chuck mount and support boxes 118 are transported through a closed horizontal path (relative to beam assembly 116) by virtue of their attachment to chuck mount transport sprocket chains 122, which are in turn driven by chuck mount transport sprocket wheels 124 mounted on shaft 126, to which rotational motion is imparted through bevel gear 127 thereon, mating with a bevel gear 128 at the end of a shaft 130 mounted on beam assembly 116 by pillow block bearings 132. Shaft 130 is in turn rotated through the engagement of gear 134 at the end thereof meshing, in the course of the rotational movement of beam assembly 116, with stationary gear 136 attached (as better seen in FIG. 6) to frame member 137.

While traversing its closed horizontal path, each chuck mount and support box 118 is supported, when beam assembly 116 is in the vertical position seen in the Figures, by roller supports 138 at the top and bottom thereof, which supports 138 ride on a flat track 140 associated with beam assembly 116 on the two inner sides thereof (all of which is shown in more detail in FIG. 10).

Also in the course of traversing its closed horizontal path, each chuck mount and support box 118 receives a rotational movement by engagement of stationary roller chains 142, associated with beam assembly 116 along the length thereof with sprocket wheels 144, thus driving a shaft 146 and bevel gear 148 on shaft 146. Bevel gear 148 in turn meshes with a mating bevel gear 150 on shaft 152, shaft 152 in turn being attached to and turning with a circular chuck mount 154 (also seen in more detail in FIG. 10).

Details of the transport means for chuck mount and support boxes 118 may be better understood by reference to FIGS. 6 and 7, sectioned, enlarged detail views taken in the plane 6—6 and 7—7, respectively, of FIG. 4. At the drive end of beam assembly 116, drive shaft 56 is secured to beam assembly end support 114 so as to impart rotational movement thereto. By power take-off from gear 136, by means previously described, transport sprocket chains 122 are also driven by shaft 56.

Each chuck mount and support box 118 is attached to transport sprocket chains 122, specifically roller chain elements 156 thereof, through bearing mounts 158 and shaft 160 mounted therein. (Seen also, in more detail, in FIG. 10).

It will be noted in FIG. 6 that at the drive shaft end of beam assembly 116, any mold 12 (as is shown in phantom in FIG. 6) which inadvertently remains on chuck mount 154 and is not removed at the unloading station 20 is removed therefrom by beam end support 114, in the course of transport from unloading station 20 to loading station 18.

At the opposite end of beam assembly 116, as seen in the detailed view of FIG. 7, transport sprocket chains 122 pass over idler sprocket wheels 162 mounted on idler shaft 164 associated with a tension-maintaining bearing support 166, better described with reference to the detailed view of FIG. 9, taken in the plane 9—9 of FIG. 7.

FIG. 8 is a detail view better showing the relationship of encircling rotary support member 22 with beam assembly 116 and molds, 12, mold support and transport boxes 118 and flat track 140 supports therefor.

In FIG. 9, tension-maintaining bearing support 166 is seen to comprise a bearing mount 168 with an elongated hole 170 to receive and permit longitudinal movement of shaft 164 therein, together with a shaft retainer 172 secured from traverse movement by side retainers 174 with longitudinal tracks 176 therein permitting lengthwise movement of shaft retainer 172. Shaft retainer 172 is in turn associated with pressure member 178 extending from a piston shaft 180 in a pneumatic cylinder 182. Split shaft collar 184 is provided to apply pressure, upon tightening, through resilient bushing 187 by preventing relative longitudinal movement of piston shaft 180 and pressure member 178. Piston shaft 180, together with piston 186, is associated with pneumatic cylinder 182, connected to a source of pressurized air, not shown. When split shaft collar 184 is loose or opened from its locked position, pressure may be applied to bearing support 166 through pressure member 178 by pneumatic pressure in pneumatic cylinder 182 forcing piston 186 and piston shaft 180 leftwardly, as seen in FIG. 9, thus increasing the tension on transport sprocket chains 122.

Once such pressure is applied, it may be maintained by tightening or fastening split shaft collar 184. In that event, continued pressure is applied by resilient bushing 187 and the pneumatic pressure in cylinder 182 may be released.

FIG. 10 is still another enlarged detail sectional view, partially cut away, in which there is shown in addition, the chuck rotating and mold mounting means. Specifically, mold 12 including steel inserts 190 at the end thereof are retained by magnetic members 192 inlaid in the face of circular chuck 154, in turn supported by chuck shaft 152 housed in chuck mount and support box 118 with bevel gear 150 at the end of chuck shaft 152 meshing therein with mating bevel gear 148 turned by roller chain sprocket 144 meshing, as previously described, with stationary roller chain 142 mounted along a face of angle iron 200 attached to one lengthwise beam of beam assembly 116. Oppositely faced to angle iron 200 is a second angle iron 202, which together with facing angle irons 204 and guide members 206 serve to transversely support (and vertically support when beam assembly 116 is rotated) roller elements 156, which in turn carry the assembly housed by and attached to box 118.

Still another pair of facing angle irons 208 on the outer face of beam assembly 116 provide the flat track 140 support upon which roller supports 138 ride.

Similar elements to those shown in the detailed views described above are, of course, reproduced on the opposite side of beam assembly 116 and with each of the plurality of chuck mount and transport boxes 118.

As seen in FIGS. 11 and 12, the assembled mold otherwise shown in the figures depicting the apparatus of this invention comprises, in detail, a lower half mold retainer 26, an upper half mold retainer 36, a quarter turn bayonet locking means 210 for holding lower mold half retainer 26 and upper mold half retainer 36 together during molding, locking means 210 having spring means 212 for urging it into the unlocked position upon turning. When upper mold half retainer 36 and lower mold half retainer 26 are assembled for use, they enclose a thin plastic lower mold element 28 and upper mold element 34, which together serve as a spin-casting mold and which after the hollow molded object is spin cast therein, is transported with the molded object and serves as a packaging therefor, in the preferred use of the present invention. There is also seen in FIG. 11, mold insert 30 comprising an insert label at the bottom of the molded product.

In the molding operation, insert 30 is placed in lower mold element 28 and the material to be molded, typically wax, is dispensed into lower mold element 28, disposed in lower half mold retainer 26 at the loading station 12 in the apparatus of this invention. Upper mold element 34 and upper mold half retainer 36 are then assembled and are clamped by bayonet locking means 210 and the assembly is transferred to the loading operation.

As seen in FIGS. 13 and 14, automatic loader 38, positioned at the delivery end of loading conveyor 24 includes a holding plate 214 onto which the assembled casting molds 12 are delivered by loading conveyor 24. At the limit of its travel in the conveyor direction, mold assembly 12 abuts stop member 216. At this point, rotation of loader driving cam 74, which engages cam follower 218, associated with loader crank arm 220, rolls gear 222 inwardly (toward chuck mount 154, i.e., to the position shown in phantom in FIG. 14) by the meshing of gear 222 with fixed rack 224 and sliding rack 226 disposed on a leftward (in FIG. 14) bottom extension of receiver plate 214. In the course of this travel, receiver plate 214 is also supported by rod mounts 228 attached to support rods 230, sliding in bushings 232.

By means of loader drive cam 74. the loading action of automatic loader 38 is a synchronized with the machine generally. Alternatively, the loader could be actuated, for example, by hydraulic pistons, synchronously driven at timed intervals. However, the mechanically synchronized driving means shown is the preferred embodiment.

FIGS. 15-17 illustrate the semi-automatic piercing table 40 of the present invention in more detail. More particularly, there is shown tabletop member 234 with perforations 236 at spaced locations corresponding to a predetermined position for piercing each molded object 238, enclosed within the package also including lower mold elements 28 and insert label 30. The pierce location generally is selected to be as inconspicuous as possible in the finished object. Piercing of the molded object is necessary to prevent collapse upon later cooling of the object and the heated air enclosed therein.

In any event, piercing is effected in a semi-automatic manner in accordance with the present invention, by curved pierced elements 240 attached to a pivotally mounted piercing frame 242 suspended from a mounting means 244 associated with tabletop member 234.

Upward movement of pierce elements 240 is effected by the hinging movement of connecting arm 246, the leftward (FIGS. 16 and 17) end of which is driven upward by a piston arm 248, associated with pneumatic cylinder 250.

Cylinder 250 and piston 248 are operated by manual push buttons 252 located on opposite sides of table top member 234, which must be pressed simultaneously to occupy both hands of the operator. As an additional safety measure, a positioning-sensing element 254 is located at one end of tabletop member 234. An interlock prevents operation of cylinder 250 and piston arm 248, together with the pierce elements 240 operated thereby, unless one end of lower half mold retainer 26 is in abutting position therewith. This together with a three sided frame element abutment 256 ensures not only accurate positioning of the mold assembly 12 in the semi-automatic piercing apparatus 40, but also ensures that both hands of the operator are occupied before pierce elements 240 are actuated.

The casting machine and auxiliary equipment of the present invention also includes as a major sub-assembly an integrated automatic filler by which the molding material, typically wax, is dispensed in lower mold halves 28 in the course of travel of mold halves 28 along conveyor 24.

Turning more specifically to FIG. 18, there is shown a filler head 280, associated with fill dispenser 32 (not seen in FIG. 18), which filler head 280 includes a plurality of fill nozzles 282 disposed in an array corresponding to the array of lower mold elements 28 disposed in lower half mold retainer 26 (as seen in FIGS. 11 and 12 and also as seen in FIG. 19). Each fill nozzle 282 is in turn connected with a supply hose 284 for delivery to fill nozzles 282 of a molding composition, typically a wax-fragrance mixture, from a filler valve assembly 286.

As indicated by the perpendicularly disposed arrows below filler head 280 in FIG. 18, filler head 280 is movable both vertically and horizontally along the length of loading conveyor 24 so that the material to be molded can be dispensed into the hollow lower mold halves as the lower mold halves are moved along loading conveyor 24.

Another invention integrally disclosed herein is a mixer and dispensing means specifically adapted to combine fragrance and molten wax in metered proportions; just prior to the dispensing thereof so as to minimize the exposure of the somewhat delicate fragrance to the high temperature of the hot wax. This is particularly useful in the molding of perfumed wax decorative room fresheners.

Filler valve assembly 286 is supplied with a material wax-fragrance mixture in the form of the invention disclosed herein from mixture forming injection valves 288 by a plurality of supply lines 290 extending from mixture forming injection valves 288 to filter valve assembly 286.

Mixture-forming injection valves 288 in turn receive wax supplied from wax reservoir 292 on which valves 288 are mounted. Fragrance is supplied to mixture-forming injection valves 288 by still another series of supply hoses 294 extending to fragrance valve assembly 296.

A single fragrance supply line 298 extends to fragrance valve assembly 296 from a fragrance reservoir (not shown).

In the illustrated form of the present invention, both valves assemblies 286 and 296 are operated on a common shaft 300 turned by crank 302 attached to a piston rod of pneumatic cylinder 304 operatively connected to sensing means 98 (not shown in FIG. 18) so as to supply a measured mixture of wax and fragrance to fill nozzles 282 upon entry of a lower half mold retainer 26 into the space under filler head 280.

Other means, shown in subsequent detail drawings, are operative on activation by sensing means 98 to raise the vertically movable piston mounting member 306, on which is mounted a plurality of filler valve piston rods 308 and a separate plurality of fragrance injection cylinders 310, fragrance injection cylinder 310 being operatively connected to fragrance valve assembly 296 through a plurality of fragrance supply hoses 312.

Further details of the filler sub-assembly of the present invention are seen in the remaining figures, with like elements similarly numbered. In FIGS. 19 and 20, there are further shown fill control motor 96 and filler valve operating eccentric 94, eccentric 94 being driven by motor 96 through gear box 95 and clutch assembly 97. Fill control motor 96 and eccentric 94 are operatively connected to provide vertical motion to piston mounting member 306 through eccentric element 314 and eccentric follower crank member 316 pivotally attached by pin 318 to piston mounting member 306.

Along the top edge of member 306, filler valve piston rods are attached thereto through filler valve piston rod support structure 320. Fragrance injection cylinders 310 are also mounted on member 306 by a separate supporting angle iron 322. Member 306 is guided in its vertical movement, at each end thereof, by sleeves 324 traveling on guide rods 326 fixed to brackets 328 mounted on supporting member 330. Also mounted on cross brace 332 attached to frame members 330 is another angle iron support member 334 to which is fixed static piston rods 336 associated with fragrance injection cylinders 310.

The functions of filler valve assembly 286 and fragrance valve assembly 296 are best seen in FIGS. 22 and 23 respectively, taken together with FIGS. 18, 19 and 20. To be seen specifically in FIGS. 22 and 23 are the operative valve elements, namely the extensions of shaft 300 projecting into each of valve assemblies 286 and 296 and including therein valve passageways 338 and 340, respectively. Passageway 338 is adapted to communicate, in the upward stroke position of pneumatic cylinder 304 and crank 302, with the interior of cylindrical recesses 342 within valve assembly 286, in which are disposed pistons 344. In the upward position shown, of pneumatic cylinder 304, crank 302, and shaft 300, passageway 338 also communicates with wax-fragrance mixture supply hoses 290 by which the mixture is delivered from injection-mixing valves 288 associated with wax reservoir 292. In this position, upon the downward stroke of member 306 and associated piston rods 308, the wax-fragrance mixture is drawn into the cylindrical interiors 342 of valve assembly 286.

In the alternative position of shaft 300 and passageway 338, upon the downward stroke of pneumatic cylinder 304, crank 302 and shaft 300, passageway 338 places into communication the cylindrical interior spaces 342 of valve assembly 286 and supply hoses 285, by which wax-fragrance mixture is delivered to filler head supply hoses 284 and ultimately to fill nozzles 282. The wax-fragrance mixture is thus delivered upon the upward stroke of piston 344, associated with piston rod 308 and member 306.

Correspondingly, passageway 340 places into communication with one another supply hoses 312, through which fragrance is received from fragrance injection cylinders 310, and supply hoses 294, by which fragrance is delivered from fragrance valve assembly 296 to injection-mixing valves 288 associated with wax reservoir 292. In the alternative position of pneumatic cylinder 304, crank 302 and shaft 300, passageway 340 places into communication supply hoses 312 from fragrance injection cylinders 310 and a plenum 346 in which is received fragrance from fragrance supply hose 298. Again, upon the downward movement of member 306, the cooperative action of static piston rods 336 and fragrance injection cylinders 310 draws fragrance from plenum 346 into cylinders 310, while upward movement of member 306, with passageway 340 in the first described position, causes fragrance to be forced upwardly and through supply hoses 294 to injection-mixing valves 288 associated with wax reservoir 292.

The mechanism by which filler head 280 is moved vertically and longitudinally along loading conveyor 24 is best seen in FIGS. 19 and 21. More specifically, sprocket wheel 84 driven by and intermeshing with chain link units of loading conveyor 24 provides synchronized power drive, through feeder drive sprocket wheel and sprocket hain set 86, to feeder movement drive shaft 348 mounted in machine base 350. Mounted in turn on shaft 348 are cams 88 and 90, cam 90 including cam track 352, in which rides roller 354 pivotally mounted to the machine base 350 through bushing mounts 358 carrying shaft 360. Near its upper end, lever member 356 includes a slotted opening 362 in which is engaged follower pin 364 attached to a shifting mounting member 366 depending from filler head 280. Associated with shifting mounting member 366 are rod bearing mounts 368 slidingly engaging permanently fixed guide rods 370, which assure the horizontal travel of filler head 280.

From this description, it is evident that rotation of shaft 348 and cam 90 produces reciprocating arcuate movement of lever member 356, which in turn produces reciprocating longitudinal movement of filler head 280 along guide rods 370.

Synchronously therewith, by common movement of shaft 348, filler head 280 is also moved in a reciprocating vertical path, the path being downward near one limit of the horizontal movement of filler head 280 (that is the delivery end) or right-hand end as seen in FIG. 2, of the filler head horizontal stroke, so as to dispose filler nozzles 282 close to lower mold path elements 28 to avoid splashing of the molten material dispensed therefrom during the filling operation. At the other limit of the horizontal stroke of filler head 280, it is moved vertically upward and away from the mold elements being transported along loading conveyor 24. This vertical reciprocatory movement is effected by a roller 372 resting on the upper outer surface of cam 88, roller 372 being pivotally connected to a lower appendage 374 of a lever member 376 extending form, at one end, a pivotal on shaft 378 mounted in bearing mounts 380 attached to a cross piece 382 of machine base 350. At its other end, lever member 376 includes a slotted opening 384 engaging a driving pin 384 attached to a horizontal member 388 of vertically moving frame 390. The vertical movement of frame 390 is guided by static bushing mounts 392. At the top of vertically moving frame 390, there is provided a top horizontal member 394 which includes a horizontal cam track 396, in which rides a cam follower 398, associated with upwardly projecting support rods 400 attached to filler head 280 and also driven in the intended reciprocatory longitudinal (horizontal) path of filler head 280 through bushing mounts 402 attached to filler head shifting mounting member 366. Filler head 280 and shifting mounting member 366 are also shown in phantom in FIG. 21 in the alternative longitudinal (horizontal) and vertical limit positions thereof.

In FIG. 24 there is shown in further detail the injection-mixing nozzles 288 associated with wax reservoir 292. In particular, there is shown, in phantom, a portion of wax reservoir 292, in which is mounted a mixing valve 404 having a first passageway 406 in communication with the interior of wax reservoir 292, a second passageway 408 in communication with fragrance supply lines 294 and a mixing chamber 410 to which both passageways lead and from which, through outlet opening 412, there is supplied to wax-fragrance supply hose 290, a mixture of wax and fragrance suitable for delivery to wax-fragrance mixture valve assembly 286. In this manner, an additive, such as fragrance in the example described, but which might otherwise include dyes or other additives, is added to the main supply of molten material used in the apparatus, wax in this preferred embodiment, just before that material is supplied to the filler head. This avoids bath mixing of the additives with the wax as might otherwise be necessary, and the attendant problems of contamination when rapid changes in the fragrance or other additive may be desired. More importantly, it avoids the long term exposure of the additive, particularly the fragrance which tends to be relatively unstable at high temperature, to the high temperature of the molten wax in the wax reservoir. Thus, while such mixing valve means and means for supplying the mixing valve are part of the preferred form of the present invention, they are not essential. The fragrance injection valve assembly and the injection-mixing injection valves may be avoided simply by adding the fragrance to the wax supply in the wax reservoir, if the aforementioned problems are not intolerable.

While the foregoing invention has been described with respect to specific apparatus and specific embodiments and components, it should be understood that it is not limited thereto and that the appended claims are intended to be construed to encompass not only the specific embodiments referred to or described but also any other variants and alternatives which may be devised by those skilled in the art without departing from the true spirit and scope of the present invention.

We claim:

1. Spin casting apparatus for molding hollow objects comprising:

a. loading conveyor adapted to receive at fixed intervals and to transport continuously a sucession of lower mold halves, b. conveyor-synchronized fill dispenser including a dispenser head having at least one fill nozzle adapted to dispense a castable liquid adapted to form a hollow object by spin-casting into said lower mold halves in the course of the transporting thereof by said loading conveyor, said dispenser including means to lower said dispenser head from a starting position to a fill elevation position, to transport said head in said fill elevation position, in synchronization with said loading conveyor, to raise said dispenser head to a return elevation position, and to return said dispenser head in said return elevation position to said starting position, said dispenser including further means to dispense said fill liquid in said recepticle in the course of said synchronized movement.

c. loader for receiving sucessive mold assemblies comprising lower mold halves, castable liquid therein, and upper mold halves mated therewith and upper and lower mold half clamping means, from said loading conveyor and transferring said mold assemblies to successively presented traveling chucks, said loader including a dead plate onto which said mold assemblies are transferred by said conveyor, including a stop member to limit the travel of said mold assemblies and push bar loading means to push each of said mold assemblies perpendicularly with respect to said conveyor motion in timed sequence with said traveling chucks whereby each of said successively transferred mold assemblies is engaged to one of said successively presented chucks, d. continuous spin caster comprising an elongated carrier means for said traveling chucks, said chucks being linearly spaced from one another along a horizontally disposed carrier means center line, further including means for continuously moving each of said chucks in a helical path about said carrier means center line, from a chuck loading position to a chuck unloading position at a predetermined rate such that the elapsed time for travel of a chuck from said loading position to said unloading position is not less than the time required for said casting material to harden in said mold, said spin caster further including means for continuously rotating each of said chucks about an axis radially projecting from said carrier means center line;

e. semi-automatic piercer adapted to form vent holes in all of molded objects disposed in said mold assemblies, said piercer comprising a tabletop adapted to receive a mold assembly with at least one perforation corresponding to the position of a molded object in said mold assembly and stop members adapted to receive and abut said mold assembly on three sides thereof, said piercer further including a manually activated swinging arm assembly having a piercing element disposed beneath said tabletop perforation and adapted upon upward swinging thereof to protrude through said perforations and to pierce hollow molded objects disposed thereat.

2. Apparatus, as recited in claim 1, further including a continuous product conveyor for receiving mold assemblies with molded product therein and transporting the molded product to a product delivery point with associated conveyor means for upper mold half clamping means removed from mold assemblies on said product conveyor and conveying said upper mold clamping means to a position convenient for the reassembly of the upper mold clamping means into new mold assemblies on said loading conveyor.

3. Apparatus as recited in claim 1, wherein said chucks are transported in an elongated eliptical path about the center line of said caster and are adapted to receive mold assemblies ready for casting near one end of said elongated eliptical path and to have mold assemblies with finish molded products therein removed from said caster at a position near the same lengthwise end of said elongated path at said mold assembly receiving end and opposite thereto.

4. Apparatus as recited in claim 1, wherein a common drive means provided rotational movement of said caster about said carrier means center line and said loader push bar loading means to effect synchronization thereof.

5. Apparatus, as recited in claim 4, wherein said common drive means also drives said loading conveyor for synchronization thereof.

6. Apparatus, as recited in claim 5, further including means for power take off from said loading conveyor to provide a coordinated driving force for the dispensing head movement means of said conveyor-synchronized filled dispenser to effect synchronization thereof.

7. Apparatus, as recited in claim 6, wherein said loading conveyor includes a sprocket chain as its driving means and said fill dispenser power take off comprising a sprocket wheel engaged therewith.

8. Apparatus, as recited in claims 1 or 6, wherein said carrier means is rotated by a driving shaft on one end thereof, said shaft turning freely within a stationary gear attached to a frame member in which said shaft is mounted, said stationary gear engaging a planetary gear and imparting rotational movement thereto to provide a synchronized driving means for moving said chucks relative to said carrier means.

9. Apparatus, as recited in claim 8, wherein said carrier means comprises a beam assembly supported for rotational movement along the length thereof by an encircling support member riding on roller bearings, said beam assembly including chuck transporting means for transporting said chucks in a generally elongated closed eliptical path about the beam assembly and relative thereto, said transporting means comprising at least one sprocket chain associated with mounting means for said chucks disposed at fixed intervals along said sprocket chain, said sprocket chain also being associated with and moved by sprocket wheels to which rotational movement is imparted by said planetary gear.

10. Apparatus, as recited in claim 9, wherein said beam assembly further include track means for supporting said chuck mounting means in the course of the travel thereof about said beam assembly.

11. Apparatus, as recited in claim 10, wherein said beam assembly track includes fixed gear means engaging drive gears within said chuck mounting means to impart rotational movement thereto in the course of transporting of said chuck mounting means about said beam assembly, said gear means within said chuck mounting means in turn imparting rotational movement to said chuck mounting means in the course of the transporting thereof about said beam assembly.

12. Semi-automatic piercer adapted to form vent holes in hollow molded objects disposed in a multicavity planar array mold, said piercer comprising a tabletop adapted to receive said mold with perforations corresponding to the positions of said objects in said array at predetermined pierce locations thereon and stop members adapted to receive and abut said mold on three sides thereof, said piercer further including a manually activated swinging arm assembly having piercing elements disposed beneath each of said perforations adapted upon upward swinging thereof to protrude through said perforations and to pierce hollow molded objects disposed thereat.

13. Semi-automatic piercer, as recited in claim 12, wherein said swinging arm assembly is activated by the simultaneous sensing of a sensor disposed upon said table at one of said stop members and by the simultaneous activation of manually operated buttons on opposed sides of said table.

14. Continuous hollow object spin caster comprising:

a. a plurality of chucks adapted to hold a hollow object mold containing a predetermined amount of spin casting material therein, said chucks being mounted on chuck mounts in turn carried by a carrier means, said chucks and chuck mounts being linearly spaced from one another along a horizontally disposed carrier means center line;

b. chuck transporting means for continuously moving each of said chucks and chuck mounts in a helical path about said carrier means center line, from a chuck loading position to a chuck unloading position at a predetermined rate such that the elapsed time for travel of a chuck from said loading position to said unloading position is not less than the time required for said casting material to hardened in said mold; and c. means for continuously rotating each of said chucks about an axis radially projecting from said machine center line.

15. Continuous hollow object spin caster, as recited in claim 14, wherein said chucks are transported in an elongated eliptical path about the center line of said caster and are adapted to receive mold assemblies ready for casting near one end of said elongated eliptical path and to have mold assemblies with finish molded products therein removed from said caster at a position near the same lengthwise end of said elongated path at said mold assembly receiving end and opposite thereto.

16. Continuous hollow object spin caster, as recited in claim 15, wherein said carrier means is rotated by a driving shaft on one end thereof, said shaft turning freely within a stationary gear attached to a frame member in which said shaft is mounted, said stationary gear engaging a planetary gear and imparting rotational movement thereto to provide a synchronized driving means for moving said chucks relative to said carrier means.

17. Continuous hollow object spin caster, as recited in claim 16, wherein said carrier means comprises a beam assembly supported for rotational movement along the length thereof by an encircling support member riding on roller bearings, said beam assembly including said chuck transporting means, said chuck transporting means adapted to transport said chucks in a generally elongated closed eliptical path about the beam assembly and relative thereto, said transporting means comprising at least one sprocket chain associated with said chuck mounts, said chuck mounts being disposed at fixed intervals along the length of said sprocket chain, said sprocket chain also being associated with and moved by sprocket wheels to which rotational movement is imparted by said planetary gear.

18. Continuous hollow object spin caster, as recited in claim 17, wherein said beam assembly further includes track means for supporting said chuck mounts in the course of the travel thereof about said beam assembly.

19. Continuous hollow object spin caster, as recited in claim 18, wherein said beam assembly track includes fixed gear means engaging drive gears associated with said chuck mounts to impart rotational movement thereto in the course of the transporting of said chuck mounts about said beam assembly, said gear means within said chuck mounts in turn imparting rotational movement to said chuck mounts in the course of the transporting thereof about said beam assembly.

20. Non-oriented hollow object spin caster mold chuck and chuck mount therefor, said mold chuck including a mounting face surface and said chuck mount including a chuck mating surface, one of said surfaces including a magnetic holding means and the other of said surfaces comprising a material adapted to be attracted to said magnetic holding means and one of said surfaces being circular, whereby said mold chuck is adapted to be magnetically retained on said chuck mount regardless of the relative radial positions of said mold chuck and chuck mount about a line perpendicular to said respective mounting surfaces, in combination with apparatus, as recited in claim 1.

21. Mold chuck and chuck mount in combination with apparatus, all as recited in claim 20 wherein said circular chuck mount chuck mating surface is composed of steel and said mold chuck mounting face surfaces includes a plurality of in-laid magnetic inserts.

22. Non-oriented hollow object spin caster mold chuck and chuck mount therefor, said mold chuck including a mounting face surface and said chuck mount including a chuck mating surface, one of said surfaces including a magnetic holding means and the other of said surfaces comprising a material adapted to be attracted to said magnetic holding means and one of said surfaces being circular, whereby said mold chuck is adapted to be magnetically retained on said chuck mount regardless of the relative radial positions of said mold chuck and chuck mount about a line perpendicular to said respective mounting surfaces, in combination with apparatus, as recited in claim 3.

23. Mold chuck and chuck mount in combination with apparatus, all as recited in claim 22 wherein said circular chuck mount chuck mating surface is composed of steel and said mold chuck mounting face surfaces includes a plurality of in-laid magnetic inserts.

24. Non-oriented hollow object spin caster mold chuck and chuck mount therefor, said mold chuck including a mounting face surface and said chuck mount including a chuck mating surface, one of said surfaces including a magnetic holding means and the other of said surfaces comprising a material adapted to be attracted to said magnetic holding means and one of said surfaces being circular, whereby said mold chuck is adapted to be magnetically retained on said chuck mount regardless of the relative radial positions of said mold chuck and chuck mount about a line perpendicular to said respective mounting surfaces, in combination with apparatus, as recited in claim 14.

25. Mold chuck and chuck mount in combination with apparatus, all as recited in claim 24 wherein said circular chuck mount chuck mating surface is composed of steel and said mold chuck mounting face surfaces includes a plurality of in-laid magnetic inserts.

26. Non-oriented hollow object spin caster mold chuck and chuck mount therefor, said mold chuck including a mounting face surface and said chuck mount including a chuck mating surface, one of said surfaces including a magnetic holding means and the other of said surfaces comprising a material adapted to be attracted to said magnetic holding means and one of said surfaces being circular, whereby said mold chuck is adapted to be magnetically retained on said chuck mount regardless of the relative radial positions of said mold chuck and chuck mount about a line perpendicular to said respective mounting surfaces, in combination with apparatus, as recited in claim 17.

27. Mold chuck and chuck mount in combination with apparatus, as recited in claim 17 wherein said circular chuck mount chuck mating surface is composed of steel and said mold chuck mounting face surfaces includes a plurality of in-laid magnetic inserts.

* * * * *